United States Patent
Faust et al.

(10) Patent No.: US 11,743,444 B2
(45) Date of Patent: Aug. 29, 2023

(54) ELECTRONIC DEVICE AND METHOD FOR TEMPORAL SYNCHRONIZATION OF VIDEOS

(71) Applicant: SONY GROUP CORPORATION, Tokyo (JP)

(72) Inventors: Brent Faust, San Diego, CA (US); Cheng-Yi Liu, San Jose, CA (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/464,781

(22) Filed: Sep. 2, 2021

(65) Prior Publication Data
US 2023/0072555 A1    Mar. 9, 2023

(51) Int. Cl.
*H04N 13/296*    (2018.01)
*H04N 13/243*    (2018.01)
*H04N 13/282*    (2018.01)
*H04N 5/06*    (2006.01)
*H04N 23/56*    (2023.01)

(52) U.S. Cl.
CPC ............ *H04N 13/296* (2018.05); *H04N 5/06* (2013.01); *H04N 13/243* (2018.05); *H04N 13/282* (2018.05); *H04N 23/56* (2023.01)

(58) Field of Classification Search
CPC ...... H04N 13/296; H04N 5/06; H04N 5/2256; H04N 13/243; H04N 13/282
USPC .......................................................... 348/48
See application file for complete search history.

(56) References Cited

U.S. PATENT DOCUMENTS

| | | | |
|---|---|---|---|
| 9,743,010 B1* | 8/2017 | Edwards | H04N 5/2357 |
| 2017/0048494 A1* | 2/2017 | Boyle | H04N 5/2354 |
| 2018/0035019 A1 | 2/2018 | Back et al. | |
| 2022/0070353 A1* | 3/2022 | Wester | H04N 23/72 |

OTHER PUBLICATIONS

Zhao, et al., "High-precision synchronization of video cameras using a single binary light source", Journal of Electronic Imaging, vol. 4, No. 4, Oct. 1, 2009, 03 pages.
Mehrabi, et al., "Video Synchronization in the Cloud Using Visible Light Communication", pdfroom.com, Jan. 1, 2015, 93 pages.

* cited by examiner

*Primary Examiner* — Susan E. Torgerson
(74) *Attorney, Agent, or Firm* — Chip Law Group

(57) ABSTRACT

Provided is an electronic device for a temporal synchronization, which determines a set of parameters associated with each imaging device of a plurality of imaging devices. The set of parameters include frame rate of each imaging device. The electronic device generates a synchronization signal that includes a preamble pulse of a first time duration set based on the frame rate and a sequence of alternating ON and OFF pulses. Each pulse of the sequence of alternating ON and OFF pulses is of a second time duration set based on the set of parameters. Based on the synchronization signal, lighting devices may be controlled to generate a pattern of alternating light pulses that is captured by each imaging device. The electronic device further acquires a plurality of images that includes information about the pattern of alternating light pulses. The electronic device further synchronizes the plurality of images, based on the information.

18 Claims, 7 Drawing Sheets

ELECTRONIC DEVICE AND METHOD FOR TEMPORAL SYNCHRONIZATION OF VIDEOS

CROSS-REFERENCE TO RELATED APPLICATIONS/INCORPORATION BY REFERENCE

None

FIELD

Various embodiments of the disclosure relate to video synchronization. More specifically, various embodiments of the disclosure relate to an electronic device and a method for temporal synchronization of videos.

BACKGROUND

Conventionally, various industries such as entertainment industry and mass communication industry may utilize a plurality of imaging devices to record a scene, such as a scene for a movie or an event. The plurality of imaging devices may further be utilized by defense industries, such as for surveillance of an area. For example, multiple cameras (such as digital cameras, drones with cameras and video cameras) may be used to record the scene or the area from multiple viewing angles. The processing of the recorded video may include synchronization of each frame of each video recorded by the respective camera. Typically, an electrical wiring may be utilized to physically connect the multiple cameras to trigger the capture and/or to synchronize the capture of videos by each camera of the multiple cameras. However, the physical connection of the multiple cameras may require a labor-intensive setup and may be a time-consuming task. Moreover, the physical connection of the cameras in motion (such as the cameras on drones) may be not possible. Thus, the physical connection between the multiple motion cameras may not be practically feasible to achieve accurate synchronization. Furthermore, for applications, such as scene reconstruction for augmented reality or virtual reality, three-dimensional (3D) object detection or motion capturing, the physical connection between the multiple cameras may be inadequate as well to provide required accuracy in the synchronization. Further, in certain post-production techniques, manual alignment of image frames (i.e. captured by multiple cameras) are performed for synchronization which may be a time-consuming task and the timing accuracy of the alignment is limited to a frame-level. In complicated multi-view applications (such as scene reconstruction for augmented reality or virtual reality, three-dimensional (3D) object detection or motion capturing), the frame-level alignment of the image frames may not be sufficient to achieve high accuracy synchronization.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and a method for temporal synchronization of videos, are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
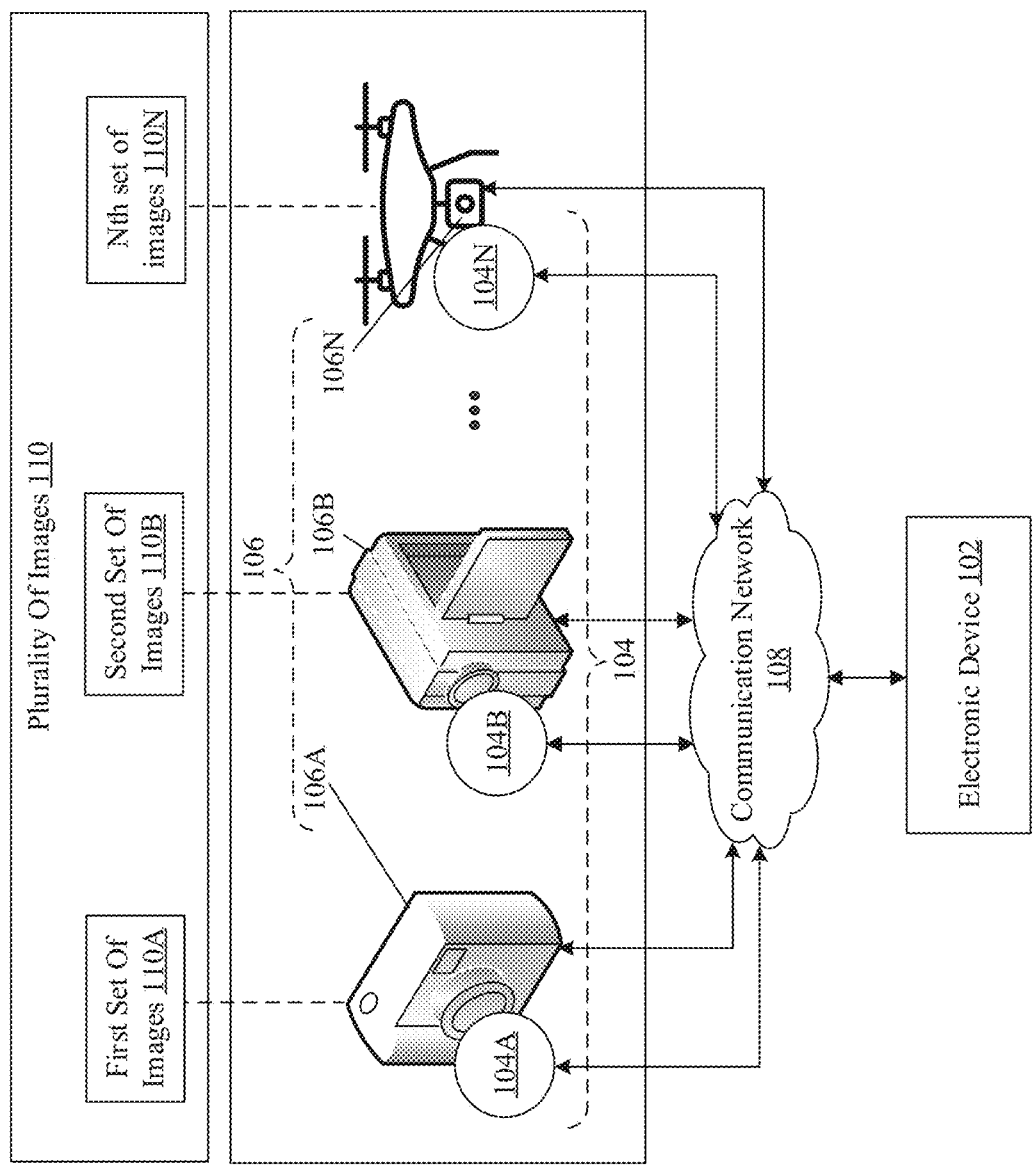
FIG. 1 is a block diagram that illustrates an exemplary network environment for temporal synchronization of videos, in accordance with an embodiment of the disclosure.

The following described implementations may be found in the disclosed electronic device and a method for temporal synchronization of a plurality of images (such as videos) with a sub-frame level timing accuracy. Exemplary aspects of the disclosure provide an electronic device for temporal synchronization of the plurality of images of a scene recorded by a plurality of imaging devices (for example, digital cameras, video cameras and cameras mounted on drones). The electronic device may be configured to determine a set of parameters associated with each imaging device of the plurality of imaging devices. The set of parameters may include at least a frame rate of each imaging device. For example, the frame rate at which each imaging device may record the plurality of images may be same or different. The electronic device may generate a synchronization signal that may include a preamble pulse of a first time duration and a sequence of alternating ON and OFF pulses, where each pulse of the sequence of alternating ON and OFF pulses may be of a second time duration. The preamble pulse may be a long duration pulse and the first time duration may be set based on the frame rate of each imaging device. Furthermore, the second time duration may be based on one or more first parameters of the determined set of parameters associated with each imaging device.

In some embodiments, a total duration of the sequence of alternating ON and OFF pulses may be based on one or more second parameters of the set of parameters. Based on the generated synchronization signal, the electronic device may control one or more lighting devices to generate a pattern of alternating light pulses. The generated pattern of alternating light pulses may be captured by the plurality of imaging devices. For example, a lighting device of the one or more lighting devices may be placed in a field of view (FOV) of each imaging device of the plurality of imaging devices. The one or more lighting devices may be controlled to generate the pattern of alternating light pulses, such that each imaging device may capture information about the generated pattern of alternating light pulses.

The electronic device may further acquire the plurality of images captured by the plurality of imaging devices. The acquired plurality of images may include the information about the pattern of alternating light pulses related to the synchronization signal. Based on the information about the captured pattern of alternating light pulses included in the acquired plurality of images, the electronic device may temporally synchronize the acquired plurality of images (such as the videos) with a timing accuracy at a sub-frame level. The automatic generation of the synchronization signal performed by the disclosed electronic device based on the set of parameters related to each imaging device, and the control of the lighting devices based on the generated synchronization signal may provide an appropriate synchronization in the capture of images by the plurality of imaging devices, without a need of using the physical wiring connections to trigger the imaging devices to capture a particular scene, as performed in certain conventional techniques.

In accordance with an embodiment, the electronic device may determine a first frame in the plurality of images (such as in each video), for each imaging device of the plurality of imaging devices. The first frame may correspond to an end of a preamble pulse of the pattern of alternating light pulses. The end of the preamble pulse may indicate a start of the sequence of alternating ON and OFF pulses of the synchronization signal in the captured information about the pattern of alternating light pulses. The electronic device may further determine, for each imaging device, an amount of light intensity in each frame of a plurality of subsequent frames of the determined first frame. For example, the amount of light intensity may be determined to detect information associated with OFF pulses and ON pulses of the sequence of alternating ON and OFF pulses corresponding to the pattern of alternating light pulses captured in the plurality of subsequent frames (i.e. subsequent to the determined first frame).

Based on the determined amount of light intensity in each frame of the plurality of subsequent frames, the electronic device may generate counter information for each imaging device. The generated counter information for each imaging device may include a first number of frames of a first set of frames (i.e. of the plurality of subsequent frames) corresponding to an OFF pulse pattern of the pattern of alternating light pulses. The counter information may further include a second number of frames of a second set of frames (of the plurality of subsequent frames) corresponding to an ON pulse pattern of the pattern of alternating light pulses. Based on the generated counter information and the set of parameters associated with each imaging device of the plurality of imaging devices, the electronic device may further determine a framing offset (i.e. sub-frame timing offset) for each imaging device. The electronic device may further synchronize (for example, temporally synchronize) the plurality of images (such as the videos) captured by the plurality of imaging devices, based on the determined framing offset. The determination of the sub-frame timing offset for each imaging device and synchronization (or alignment) of the captured images acquired from multiple imaging devices based on the corresponding sub-frame timing offset, may provide a high accuracy temporal synchronization of videos captured by the multiple imaging devices from different viewpoints.

Conventionally, certain systems may utilize hardware, such as an electrical wiring to physically connect the plurality of imaging devices for the synchronization of the capture, that may be difficult to implement as the physical connection may have to be performed manually, which may require a labor-intensive setup and may be a time-consuming task. Further, the physical connection of the imaging devices in motion (such as the cameras on drones) may not be a feasible task. On the contrary, the electronic device of the present disclosure may generate the synchronization signal based on the frame rate of each imaging device of the plurality of imaging devices. Such a synchronization signal may be utilized to synchronize (such as temporally synchronize) the capture of the plurality of images (such as the videos) by the plurality of imaging devices. Further, the determined framing offset in the captured plurality of images may be utilized to synchronize the captured plurality of images (such as the videos) to a sub-frame accuracy level. In other words, the disclosed electronic device may determine an exact timing within a frame of the plurality of images, based on which the captured plurality of images may be synchronized at a better accuracy, in comparison to synchronization performed at a frame-level. Therefore, the disclosed electronic device may enable synchronization of capture of the plurality of images without use of the hardware, such as the electrical wiring to trigger multiple imaging devices. Further, the electronic device of the present disclosure may provide an easy to implement setup that may be time effective and highly accurate to provide temporal synchronization of the plurality of images.

FIG. 1 is a block diagram that illustrates an exemplary network environment for temporal synchronization of videos, in accordance with an embodiment of the disclosure. With reference to FIG. 1, there is shown a network environment 100. The network environment 100 may include an electronic device 102. The network environment 100 may further include one or more first lighting devices 104, such as a first lighting device 104A, a second lighting device 1048, and . . . an Nth lighting device 104N. The network environment 100 may further include a plurality of imaging devices 106, such as a first imaging device 106A, a second imaging device 106B, . . . and an Nth imaging device 106N. The network environment 100 may further include a communication network 108. The network environment 100 may further include a plurality of images 110 recorded by the plurality of imaging devices 106. The plurality of images 110 may include a first set of images 110A recorded by the first imaging device 106A, a second set of images 1108 recorded by the second imaging device 1068, and an Nth set of images 110N recorded by the Nth imaging device 106N. The electronic device 102, the one or more first lighting devices 104 and the plurality of imaging devices 106 may be communicably coupled to each other, via the communication network 108.

The electronic device 102 may include suitable logic, circuitry, and interfaces that may be configured to generate the synchronization signal. The electronic device 102 may be further configured to temporally synchronize the plurality of images 110 based on the generated synchronization signal. Examples of the electronic device 102 may include, but are not limited to, a controller device, a calibration device, computing device, an imaging device, a smartphone, a cellular phone, a mobile phone, a ground station controller (GCS), a gaming device, a mainframe machine, a server, a computer workstation, and/or a consumer electronic (CE) device.

The one or more first lighting devices 104 may include suitable logic, circuitry, and interfaces that may be configured to generate a pattern of alternating light pulses. The one or more first lighting devices 104 may generate or illuminate the pattern of alternating light pulses based on the synchronization signal generated by the electronic device 102. Examples of the one or more first lighting devices 104 may include, but are not limited to, a light-emitting diode (LED), an LED strip, or a light bulb. For example, the LED may be an LED bulb, an LED lighting tube, an LED surface mounted device and a chip on board LED. The one or more first lighting devices 104 may be positioned in front of the corresponding imaging device of the plurality of imaging devices 106 such that a field-of-view (FOV) of each of the plurality of imaging devices 106 may include the corresponding lighting device, for example, as shown in FIG. 1.

The plurality of imaging devices 106 may include suitable logic, circuitry, and interfaces that may be configured to capture the plurality of images, such as the plurality of images of scenes of a movie, or an area for surveillance. The plurality of imaging devices 106 may be further configured to capture the plurality of images of the pattern of alternating light pulses generated by the one or more first lighting devices 104. Examples of the plurality of imaging devices 106 may include, but are not limited to, an image sensor, a wide-angle camera, an action camera, a closed-circuit television (CCTV) camera, a camcorder, a digital camera, camera phones, a time-of-flight camera (ToF camera), a night-vision camera, and/or other image capture devices. In some embodiments, one or more imaging devices (such as the Nth imaging device 106N) of the plurality of imaging devices 106 may be mounted or positioned on a drone (or an unmanned aerial vehicle (UAV)) to capture one or more images (such as the Nth set of images 110N) of the plurality of images 110.

The communication network 108 may include a communication medium through which the electronic device 102, the one or more first lighting devices 104 and the plurality of imaging devices 106 may communicate with each other. The communication network 108 may be one of a wired connection or a wireless connection. Examples of the communication network 108 may include, but are not limited to, the Internet, a cloud network, Cellular or Wireless Mobile Network (such as Long-Term Evolution and 5G New Radio), a Wireless Fidelity (Wi-Fi) network, a Personal Area Network (PAN), a Local Area Network (LAN), or a Metropolitan Area Network (MAN). Various devices in the network environment 100 may be configured to connect to the communication network 108 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the plurality of imaging devices 106 may be arranged at different positions to record a scene, for example, a scene of a movie, an event, or an area for surveillance. The plurality of imaging devices 106 may be arranged to record the scene from different viewpoints. In one or more embodiments, the plurality of imaging devices 106 may be switched ON (such as activated) and switch OFF (such as deactivated) manually. The electronic device 102 may be configured to determine a set of parameters associated with each imaging device, such as the first imaging device 106A, the second imaging device 106B, and . . . the Nth imaging device 106N of the plurality of imaging devices 106. The set of parameters may include at least a frame rate of each imaging device of the plurality of imaging devices 106. In one or more embodiments, the frame rate corresponding to each imaging device of the plurality of imaging devices 106 may be different. In some embodiments, the frame rate corresponding to each imaging device may be same. For example, the frame rate associated with each imaging device may be equal to or more than 25 frames per second (fps). The determined set of parameters associated with each imaging device may further include, but are not limited to, exposure information, shutter speed information, aperture information, ISO information associated with each imaging device, focus information, zooming information, and so forth. For example, a shutter speed of each imaging device may be equal to an inverse of a frame rate of the respective imaging device. Details of the determination of the set of parameters are further described, for example, in FIG. 3.

The electronic device 102 may be configured to generate the synchronization signal that may include a preamble pulse of a first time duration and a sequence of alternating ON and OFF pulses. The first time duration may be based on the frame rate of each imaging device of the plurality of imaging devices 106. For example, the first time duration may be more than a time period of one frame of each of the first set of images 110A, the second set of images 110B, and . . . the Nth set of images 110N. Further, each pulse of the sequence of alternating ON and OFF pulses may be of a second time duration. The second time duration may be based on one or more first parameters of the determined set of parameters associated with each imaging device. Details of the generation of the synchronization signal are further described, for example, in FIG. 3.

In accordance with an embodiment, the determined set of parameters may further include a first positive integer value and a second positive integer value corresponding to each imaging device of the plurality of imaging devices 106. The electronic device 102 may be further configured to determine the first positive integer value and the second positive integer value based on the corresponding frame rate of each imaging device of the plurality of imaging devices. For example, the frame rate corresponding to the first imaging device 106A may be 25 fps, the frame rate corresponding to the second imaging device 106B may be 30 fps, and the frame rate corresponding to the Nth imaging device 106N may be 40 fps. The first positive integer value and the second positive integer value may be determined based on the frame rates of each imaging device of the plurality of imaging devices 106.

In accordance with an embodiment, the electronic device 102 may be further configured to determine the second time duration of each pulse of the sequence of alternating ON and OFF pulses of the synchronization signal based on the frame rate, the determined first positive integer value, and the determined second positive integer value associated with each imaging device of the plurality of imaging devices 106. Each of the determined first positive integer value and the determined second positive integer value may correspond to the one or more first parameters of the set of parameters.

In accordance with an embodiment, a total duration of the sequence of alternating ON and OFF pulses of the synchronization signal may be based on one or more second parameters of the determined set of parameters. In some embodiments, the determined set of parameters may further include a third positive integer value that may correspond to the one or more second parameters. The electronic device 102 may further be configured to determine the total duration of the sequence of alternating ON and OFF pulses of the synchronization signal based on the determined first positive integer value and the third positive integer value. In one or more embodiments, the one or more first parameters of the determined set of parameters may be different from the one or more second parameters of the determined set of parameters. Details of the one or more first parameters and the one or more second parameters of the set of parameters are further described, for example, in FIG. 3.

Based on the generated synchronization signal, the electronic device 102 may control the one or more first lighting devices 104 to generate a pattern of alternating light pulses. For example, each lighting device of the one or more first lighting devices 104 may correspond to a respective imaging device of the plurality of imaging devices 106. In an exemplary scenario, the first lighting device 104A may correspond to the first imaging device 106A and may be placed in a field of view (FOV) of the first imaging device 106A. The second lighting device 104B may correspond to the second imaging device 106B and may be placed in a field of view (FOV) of the second imaging device 106B. The Nth lighting device 104N may correspond to the Nth imaging device 106N and may be placed in a field of view (FOV) of the Nth imaging device 106N. The electronic device 102 may activate the one or more first lighting devices 104, such that the generated pattern of alternating light pulses may be captured by the plurality of imaging devices 106. Details of the control of the one or more first lighting devices 104 are further described, for example, in FIG. 4.

The electronic device 102 may further acquire the plurality of images 110 captured by the plurality of imaging devices 106. The acquired plurality of images 110 may include information about the captured pattern of alternating light pulses. In addition, the plurality of images 110 may further include image frames related to one or more objects/scenes captured by the plurality of imaging devices 106. The electronic device 102 may acquire the plurality of images 110 via the communication network 108. Based on the information (i.e. amount of light intensity) about the captured pattern of alternating light pulses included in the acquired plurality of images 110, the electronic device 102 may synchronize the acquired plurality of images 110. For example, the electronic device 102 may temporally synchronize the plurality of images 110.

In accordance with an embodiment, the electronic device 102 may be configured to determine, for each imaging device of the plurality of imaging devices 106, a first frame in the acquired plurality of images 110 (such as the videos). The first frame may correspond to an end of the preamble pulse of the pattern of alternating light pulses. For example, the information associated with the preamble pulse may be included from a frame "120" till a frame "542" of a first set of images (such as a first video) of the plurality of images 110 associated with the first imaging device 106A. The first frame may correspond to the frame "542", that may correspond to the end of the preamble pulse.

The electronic device 102 may further determine, for each imaging device, an amount of light intensity in each frame of a plurality of subsequent frames of the determined first frame. For example, the plurality of subsequent frames may include the information associated with the sequence of alternating ON and OFF pulses of the pattern of alternating light pulses. The amount of light intensity may be determined to detect a first set of frames that may correspond to an OFF pulse pattern of the sequence of alternating ON and OFF pulses and further to detect a second set of frames that may correspond to an ON pulse pattern of the sequence of alternating ON and OFF pulses in the first set of images (such as a first video). Details of the determination of the first set of frames and the second set of frames are further described, for example, in FIG. 5.

Based on the determined amount of light intensity in each frame of the plurality of subsequent frames, the electronic device 102 may generate counter information for each imaging device. The generated counter information for each imaging device may include a first number of frames of the first set of frames (i.e. out of the plurality of subsequent frames) corresponding to the OFF pulse pattern of the pattern of alternating light pulses. The generated counter information may further include a second number of frames of the second set of frames (i.e. out of the plurality of subsequent frames) corresponding to the ON pulse pattern of the pattern of alternating light pulses.

Based on the generated counter information and the determined set of parameters associated with each imaging device of the plurality of imaging devices 106, the electronic device 102 may determine a framing offset (i.e. sub-frame timing offset) for each imaging device. The framing offset may indicate a position of the end of the preamble pattern and a start of the sequence of alternating ON and OFF pulses 304 in the determined first frame. Based on the determined framing offset for each imaging device of the plurality of imaging devices 106, the electronic device 102 may synchronize the acquired plurality of images 110 (such as the videos). Details of the determination of the framing offset and temporal synchronization are further described, for example, in FIG. 5.

Figure 2:
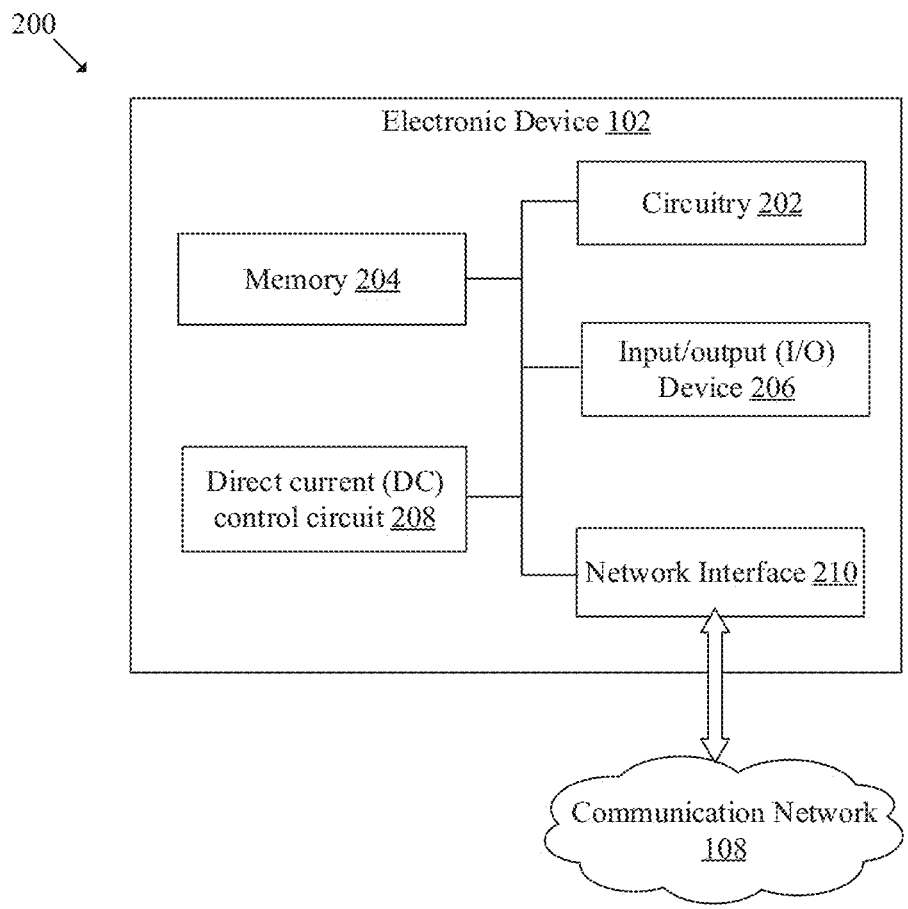
FIG. 2 is a block diagram that illustrates an exemplary electronic device for temporal synchronization of videos, in accordance with an embodiment of the disclosure.

FIG. 2 is a block diagram that illustrates an exemplary electronic device for temporal synchronization of videos, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a memory 204, an input/output (I/O) device 206, a direct current (DC) control circuit 208, and a network interface 210.

The circuitry 202 may include suitable logic, circuitry, and/or interfaces, that may be configured to execute program instructions associated with different operations to be executed by the electronic device 102. For example, some of the operations may include generation of the synchronization signal and temporal synchronization of the plurality of images 110 based on the generated synchronization signal. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a field programmable gate arrays (FPGAs) processor, a microcontroller, a central processing unit (CPU), and/or other control circuits.

The memory 204 may include suitable logic, circuitry, interfaces, and/or code that may be configured to store the one or more instructions to be executed by the circuitry 202. The memory 204 may be configured to store the plurality of images 110 captured by the plurality of imaging devices 106. In some embodiments, the memory 204 may be configured to store the generated synchronization signal and the set of parameters associated with the plurality of imaging devices 106. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and interfaces that may be configured to receive an input and provide an output based on the received input. For example, the I/O device 206 may receive an input from a user for temporal synchronization of the plurality of images 110. The input may include, but is not limited to, information about the frame rate of each of the plurality of imaging devices 106. In an embodiment, the I/O device 206 may output the plurality of images 110 captured by the plurality of imaging devices 106 and/or information about the framing offset determined for each imaging device. The I/O device 206 which may include various input and output devices, may be configured to communicate with the circuitry 202. Examples of the I/O device 206 may include, but are not limited to, a touch screen, a keyboard, a mouse, a joystick, a microphone, a display device, and a speaker.

The DC control circuit 208 may include suitable logic, circuitry, and interfaces that may be configured to control the drive of the one or more first lighting devices 104 based on the generated synchronization signal. The DC control circuit 208 may receive the synchronization signal from the circuitry 202 may further activate or deactivate the one or more first lighting devices 104 based on the received synchronization signal. Based on the activation or deactivation of the one or more first lighting devices 104, the one or more first lighting devices 104 may generate the pattern of alternating light pulses corresponding to the synchronization signal. In an exemplary embodiment, the DC control circuit 208 may be a bipolar junction transistor (BJT) based control circuit or a metal oxide semiconductor field effect transistor (MOSFET) based control circuit which may be used to drive the one or more first lighting devices 104. Although in FIG. 2, the DC control circuit 208 is shown separated from the circuitry 202, the disclosure is not so limited. Accordingly, in some embodiments, the DC control circuit 208 may be integrated in the circuitry 202, without deviation from scope of the disclosure. In some embodiments, the DC control circuit 208 may be integrated in the one or more first lighting devices 104 and may receive an activation signal or a deactivation signal from the circuitry 202, via the communication network 108, to activate of deactivate the one or more first lighting devices 104

The network interface 210 may comprise suitable logic, circuitry, and/or interfaces that may be configured to facilitate communication between the electronic device 102, the one or more first lighting devices 104 and the plurality of imaging devices 106 via the communication network 108. The network interface 210 may be implemented utilizing various known technologies to support wired or wireless communication of the electronic device 102 with the communication network 108. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 210 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5G communication, code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

A person of ordinary skill in the art will understand that the electronic device 102 in FIG. 2 may also include other suitable components or systems, in addition to the components or systems which are illustrated herein to describe and explain the function and operation of the present disclosure. A detailed description for the other components or systems of the electronic device 102 has been omitted from the disclosure for the sake of brevity. The operations of the circuitry 202 are further described, for example, in FIGS. 3, 4, and 5.

Figure 3:
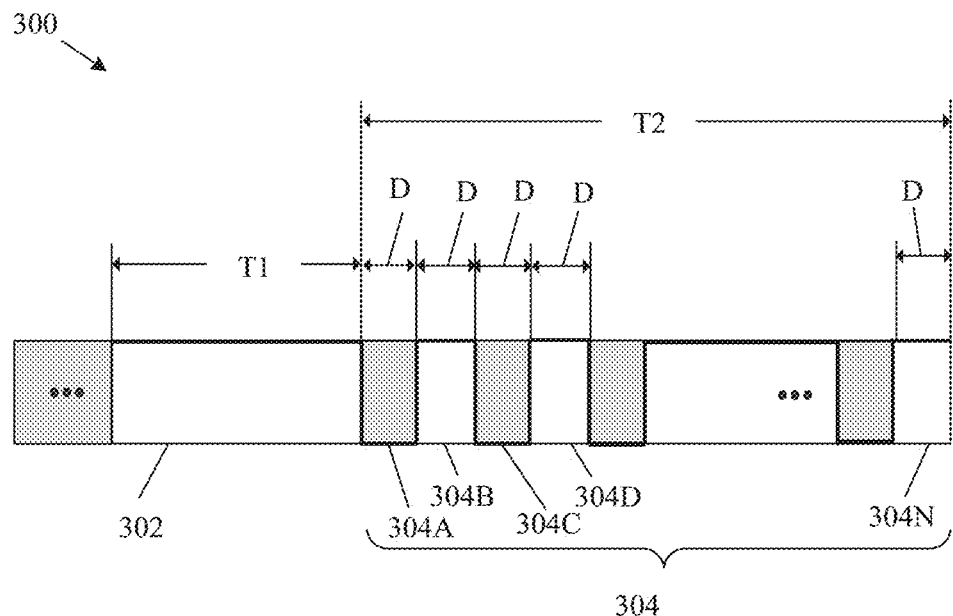
FIG. 3 is a diagram that illustrates an exemplary synchronization signal, in accordance with an embodiment of the disclosure.

FIG. 3 is a diagram that illustrates an exemplary synchronization signal, in accordance with an embodiment of the disclosure. FIG. 3 is explained in conjunction with elements from FIGS. 1 and 2. With reference to FIG. 3, there is shown an exemplary synchronization signal 300. The synchronization signal 300 may include a preamble pulse 302 and a sequence of alternating ON/OFF pulses 304. The sequence of alternating ON/OFF pulses 304 may include a first OFF pulse 304A, a first ON pulse 304B, a second OFF pulse 304C, a second ON pulse 304D, . . . , and an Nth ON pulse 304N.

The circuitry 202 may be configured to determine the set of parameters associated with each imaging device of the plurality of imaging devices 106. In an embodiment, the memory 204 may store the set of parameters related to the plurality of imaging devices 106. In such case, the circuitry 202 may retrieve the set of parameters from the memory 204 to determine the set of parameters for each imaging device. In other embodiments, the circuitry 202 may directly receive the set of parameters from each of the plurality of imaging devices 106, via the communication network 108. The set of parameters may include at least the frame rate of each imaging device. The set of parameters associated with each imaging device may further include, but is not limited to, exposure information, shutter speed information, aperture information, sensitivity parameter, white balance information, focus information, and/or zooming information associated with each imaging device. In an example, a white balance of each imaging device may be OFF. In an embodiment, the focus information and the zooming information may be same and constant for each imaging device of the plurality of imaging devices 106.

The circuitry 202 may further generate the synchronization signal 300 that may include the preamble pulse 302 of a first time duration (such as a duration "T1") and the sequence of alternating ON and OFF pulses 304. Each pulse of the sequence of alternating ON and OFF pulses 304 may be of a second time duration (such as a duration "D", as shown in FIG. 3). In such a case, each pulse of the sequence of alternating ON and OFF pulses 304 may be of the same second time duration.

The first time duration may be determined based on the frame rate of each imaging device. The first time duration may be set such that the first time duration may be equal to or more than a time duration of one or more frames of the first set of images 110A, the second set of images 110B (for example, considering there are two imaging devices). In other words, the first time duration may be set based on the total time duration (i.e. frame duration) of one or more frames captured by each of the plurality of imaging devices 106. For example, the frame rate of the first imaging device 106A may be 30 fps, and the frame rate of the second imaging device 1068 may be 35 fps. In such a case, the first set of images 110A (i.e. captured by the first imaging device 106A) may include 30 frames within a time period of one second, whereas the second set of images 110B (i.e. captured by the second imaging device 106B) may include 35 frames within the time period of one second. Thus, the first time duration ("T1) may be sum of the time duration of at least one frame (i.e. 33.33 milliseconds) of the first set of images 110A and the time duration of at least one frame (i.e. 28.6 milliseconds) of the second set of images 110B. The circuitry 202 may set the first time duration ("T1") in few seconds, for example, 1-10 seconds. Thus, the preamble pulse 302 may be a long duration pulse.

The second time duration of each pulse of the sequence of alternating ON and OFF pulses 304 may be based on the one or more first parameters of the determined set of parameters associated with each imaging device. The circuitry 202 may determine the second time duration, such as to achieve sub-frame timing accuracy. The second time duration may be determined based on equation (1) as follows:

$$D = n_i \tau_i + p_i \quad (1)$$

where D is the second time duration, $\tau_i$ is a time period of each frame of the first set of images 110A and "i" represent an imaging device (such as the first imaging device 106A).

$$\text{Further, } \tau_i = p_i \times q_i \quad (2)$$

where $q_i$ is a first positive integer value, $n_i$ is a second positive integer value corresponding to the imaging device (such as the first imaging device 106A), and $p_i$ is an integer corresponding to a resolution of a subframe accuracy in milliseconds (msec) associated with the imaging device (such as the first imaging device 106A).

In accordance with an embodiment, the determined set of parameters may further include the first positive integer value and the second positive integer value corresponding to each imaging device of the plurality of imaging devices 106. The circuitry 202 may be further configured to determine the first positive integer value and the second positive integer value based on the corresponding frame rate of each imaging device of the plurality of imaging devices 106.

In an exemplary scenario, the frame rate of the first imaging device 106A may be $f_i$ fps. Thus, the time period $\tau_i$ of each frame of the first set of images 110A may be $1000/f_i$ milliseconds. Based on the frame rate of the first imaging device 106A, the circuitry 202 may determine the time period $\tau_i$ for the first imaging device 106A. The circuitry 202 may determine the integer $p_i$ based on the resolution of the first imaging device 106A and further determine the first positive integer value $q_i$ utilizing equation (2).

Furthermore, the circuitry 202 may determine the second positive integer value $n_i$ based on a number of frames of the first set of images 110A that may include the OFF pulse pattern of the sequence of alternating ON and OFF pulses 304 or the ON pulse pattern of the sequence of alternating ON and OFF pulses 304. In an embodiment, the $n_i$ indicates the number of frames of the set of images (i.e. capture by a particular imaging device) that may be included or counted in the second time duration ("D). For example, in case the second time duration ("D) is of 2000 msec and $\tau_i$ is 480 msec, then $n_i$ may be four, indicating that the four number of image frames may be included in the second time duration ("D").

In accordance with an embodiment, the circuitry 202 may be further configured to determine the second time duration (D) of each pulse of the sequence of alternating ON and OFF pulses 304 based on the frame rate $f_i$, the determined first positive integer value $q_i$, and the determined second positive integer value $n_i$ associated with each imaging device of the plurality of imaging devices 106 utilizing equation (1). Each of the determined first positive integer value and the determined second positive integer value may correspond to the one or more first parameters of the determined set of parameters. For example, in case the second time duration ("D") is 2000 msec and the frame timing ($\tau_i$) of the first set of images 110A is 480 msec, then $n_i$ may be "4", $p_i$ may be "80" and $q_i$ may be "6" based on equations (1) and (2). Similarly, based on known or predefined values of $\tau_i$, $n_i$, $p_i$, and $q_i$, the second time duration ("D") may be determined based on use of equations (1) and (2). In some embodiments, the second time duration (D) may be determined utilizing a Chinese remainder theorem when the integer $p_i$ and the time period $\tau_i$ may be natural numbers. In one or more embodiments, the second time duration (D) may be determined by utilizing a least common multiple (LCM) and a greatest common divisor (GCD) of fractions when the time period $\tau_i$ may be a rational number.

In accordance with an embodiment, the total duration (such as a duration "T2" shown in FIG. 3) of the sequence of alternating ON and OFF pulses 304 of the synchronization signal 300 may be based on one or more second parameters of the determined set of parameters. The determined set of parameters may further include a third positive integer value that may correspond to the one or more second parameters of the set of parameters. The third positive integer value "m" may be determined based on a tradeoff between a synchronization time and accuracy of the synchronization of the plurality of images 110. In some embodiments, higher a value of the third positive integer value "m", higher may be the accuracy of the synchronization of the plurality of images 110 and higher may be a time required for the synchronization of the plurality of images 110. For example, higher the value of the third positive integer value "m", larger may be the total duration "T2" of the sequence of alternating ON and OFF pulses 304 of the synchronization signal 300. In such a case, determination of the pattern of ON and OFF pulses corresponding to the sequence of alternating ON and OFF pulses 304 in the plurality of images 110 may be more time consuming as additional pulses of the pattern of ON and OFF pulses may be determined for the synchronization. However, such a determination of the additional pulses of the pattern of ON and OFF pulses may also ensure more accuracy, as the determination of the more number of pulses may ensure that the pattern of ON and OFF pulses may be correctly determined in the plurality of images 110, thereby, reducing a false positive rate. In accordance with an embodiment, the circuitry 202 may be configured to determine the total duration ("T2") of the sequence of alternating ON and OFF pulses 304 of the synchronization signal 300 based on the determined first positive integer value and the third positive integer value based on equation (3), as follows:

$$T2 = m*N \quad (3)$$

where "N"=max $q_i$. In an embodiment, N may be determined based a maximum value of the first positive integer value $q_i$ corresponding to each imaging device of the plurality of imaging devices 106.

In accordance with an embodiment, the one or more first parameters of the determined set of parameters may be different from the one or more second parameters of the determined set of parameters. For example, the one or more first parameters may include the first positive integer value $q_i$ and the second positive integer value $n_i$. The one or more second parameters may include the third positive integer value "m".

In an exemplary scenario, the determined set of parameters associated with the first imaging device 106A may be, for example, the frame time period $\tau_i$=480 msec, the first positive integer value $q_i$=6, the integer $p_i$=80, the second positive integer value $n_i$=4. The determined set of parameters associated with the second imaging device 106B may be, for example, the frame time period $\tau_j$=375 msec, the first positive integer value $q_j$=3, the integer $p_j$=125, the second positive integer value $n_j$=5. Based on the determined set of parameters, the second time duration ("D") may be determined as 2000 msec, based on equations (1) and (2). Furthermore, as N=max $q_i$, N=max (6,3)="6", and the third positive integer value "m" may be "2". Thus, the total duration ("T2") may be determined as "12" based on equation (3). As per the time period $\tau_i=p_i \times q_i$ (according to equation (2)), the first positive integer value $q_i$>1, and $p_i$ and $q_i \in N$, which may imply that $p_i \leq 0.5\ \tau\tau_i$ and $1.5\ p_i \leq 0.75\ \tau_i$. Thus, the sub-frame accuracy may be achieved with respect to each imaging device. In such a case, an aligning error between the plurality of imaging devices 106 may be minimized. In an embodiment, the circuitry 202 may determine the second time duration ("D") such that a rising edge of the OFF pulse pattern corresponding to the first OFF pulse 304A of the pattern of alternating light pulses may coincide with an edge of a frame (such as a falling edge of a first frame) of the first set of images 110A with a framing offset. The framing offset may be less than $p_i \leq 0.5\ \tau_i$. Details of the determination of the framing offset and the sub-frame accuracy are further described, for example, in FIG. 5.

Figure 4:
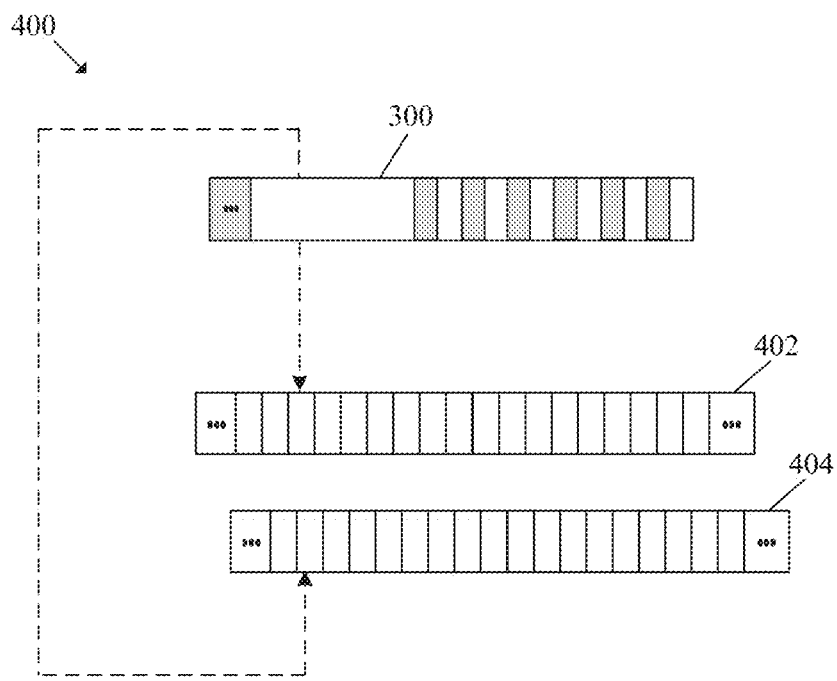
FIG. 4 is a diagram that illustrates a pattern of alternating light pulses in a plurality of images captured by a plurality of imaging devices, in accordance with an embodiment of the disclosure.

FIG. 4 is a diagram that illustrates a pattern of alternating light pulses in a plurality of images captured by a plurality of imaging devices, in accordance with an embodiment of the disclosure. FIG. 4 is explained in conjunction with elements from FIGS. 1, 2 and 3. With reference to FIG. 4, there is shown a diagram 400. The diagram 400 may include a first video 402, a second video 404 and the synchronization signal 300.

The first video 402 may correspond to the first set of images 110A captured by the first imaging device 106A. The second video 404 may correspond to the second set of images 1108 captured by the second imaging device 106B. The circuitry 202 may be configured to control the one or more first lighting devices 104 based on the generated synchronization signal 300 to generate the pattern of alternating light pulses. The one or more first lighting devices 104 may be activated to generate or illuminate the pattern of alternating light pulses. The one or more first lighting devices 104 may be in the field of view of the respective imaging device. For example, each lighting device of the one or more first lighting devices 104 may be in contact with a lens of the respective imaging device of the plurality of imaging devices 106. In another example, the one or more first lighting devices 104 may be at a certain distance (i.e. in centimeter, inch, feet, or meter) with respect to the lenses of the plurality of imaging devices 106. The generated pattern of alternating light pulses may be captured by the plurality of imaging devices 106 based on the control of the electronic device 102.

In some embodiments, the one or more first lighting devices 104 may include a second lighting device (not shown) that may include a grid of lights. The circuitry 202 may control the rotation and/or translation of the second lighting device towards each imaging device, such that the controlled second lighting device may be in the field of view (FOV) of respective imaging device based on the rotation/translation. When the grid of lights of the second lighting device may be in the field of view of each imaging device, the circuitry 202 may control the second lighting device to generate the pattern of alternating light pulses.

The circuitry 202 may further acquire the plurality of images 110 (such as the first video 402 and the second video 404) captured by the plurality of imaging devices 106. The plurality of images 110 may be acquired from the plurality of imaging devices 106. For example, the circuitry 202 may send one or more request commands to the plurality of imaging devices 106 to send the captured images, respectively. In other embodiments, the plurality of imaging devices 106 may be configured to send the plurality of images 110 automatically based on the capture of the corresponding images. The acquired plurality of images 110 may include information about the captured pattern of alternating light pulses. In addition, the plurality of images 110 may further include image frames related to one or more objects/scenes captured by the plurality of imaging devices 106 after the capture of the pattern of alternating light pulses generated by the one or more first lighting devices 104 based on the synchronization signal 300. For example, the pattern of alternating light pulses may be captured by the plurality of imaging devices 106 at different instants of time, due to hardware limitations or deviations in the plurality of imaging devices 106. In an exemplary scenario, a start of capture of the pattern of alternating light pulses in the first video 402 may be at a frame number "350" or at a particular sub-frame timing of a particular frame. Similarly, a start of capture of the pattern of alternating light pulses in the second video 404 may be at a frame number "162" or at a particular sub-frame timing of a particular frame, due to different instants of time to capture the pattern of alternating light pulses produced by the one or more first lighting devices 104.

The circuitry 202 may further synchronize the acquired plurality of images, based on the information about the captured pattern of alternating light pulses included in the acquired plurality of images. Based on an exact position (for example sub-frame timing) of the start of the pattern of alternating light pulses in the plurality of images 110, the plurality of images 110 may be synchronized. Details of the synchronization of the plurality of images 110 are further described, for example, in FIG. 5.

Figure 5:
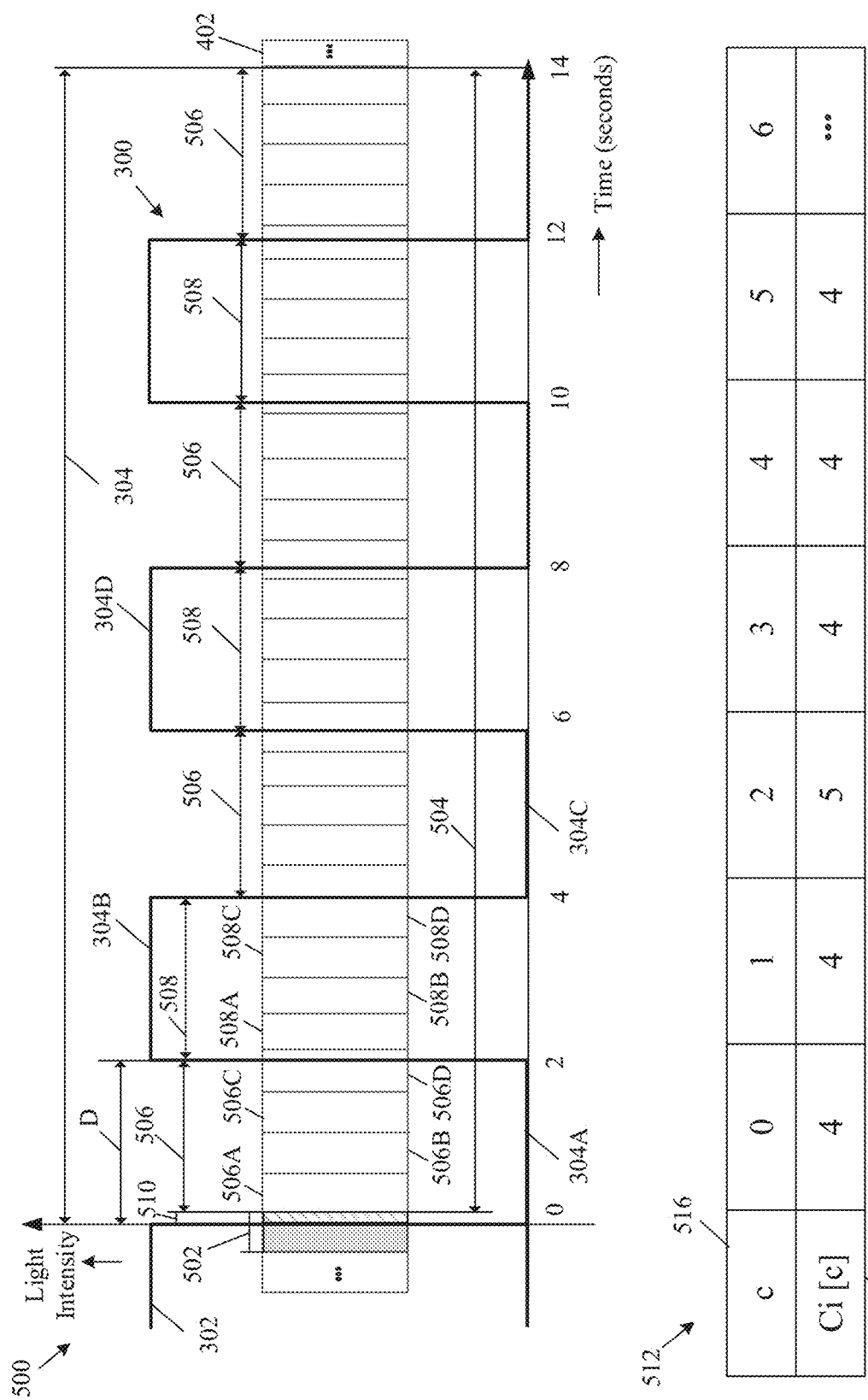
FIG. 5 is a diagram that illustrates temporal synchronization of the plurality of images captured by the plurality of imaging devices, in accordance with an embodiment of the disclosure.

FIG. 5 is a diagram that illustrates temporal synchronization of the plurality of images captured by the plurality of imaging devices, in accordance with an embodiment of the disclosure. FIG. 5 is explained in conjunction with elements from FIGS. 1, 2, 3 and 4. With reference to FIG. 5, there is shown a diagram 500. The diagram 500 may include the synchronization signal 300. The synchronization signal 300 may include the preamble pulse 302 and the sequence of alternating ON and OFF pulses 304. The sequence of alternating ON/OFF pulses 304 may further include a first OFF pulse 304A, a first ON pulse 304B, a second OFF pulse 304C, a second ON pulse 304D, and so on (as described, for example, in FIG. 3 as well). The diagram 500 may further include the first video 402, for example, captured by the first imaging device 106A.

The first video 402 may include information about the synchronization signal 300 (i.e. information about the captured pattern of alternating light pulses related to the preamble pulse 302 and the sequence of alternating ON and OFF pulses 304 as shown in FIGS. 3 and 5). In addition, the first video 402 may further include image frames related to one or more objects/scenes captured by the first imaging device 106A from a particular viewpoint. Such image frames may be included in the first video 402 after the information about the captured pattern of alternating light pulses. The first video 402 may include a first frame 502 and a plurality of subsequent frames 504. The plurality of subsequent frames 504 may include a first set of frames 506, a second set of frames 508 and a framing offset 510. Furthermore, the diagram 500 may include counter information 512. The counter information 512 may include a set of incremental counter values 514 and a counter index number 516.

The diagram 500 may depict a timing graph. An x-axis of the timing graph may correspond to a light intensity of each frame of the first video 402. A y-axis of the timing graph may correspond to time (in seconds) of the first video 402. In accordance with an embodiment, the circuitry 202 may be configured to determine, the first frame 502 in the acquired plurality of images 110 (such as the first video 402 corresponding to the first set of images 110A of the plurality of images 110). The first frame 502 may correspond to an end of the preamble pulse 302 of the pattern of alternating light pulses (such as corresponding to the synchronization signal 300).

In accordance with an embodiment, the circuitry 202 may be configured to determine a first OFF threshold value associated with presence of the OFF pulse pattern in the pattern of alternating light pulses, for each imaging device. For example, the first frame 502 may include information associated with a portion (such as an end portion) of the captured preamble pulse 302 of the synchronization signal 300 corresponding to the pattern of alternating light pulses. The first frame 502 may further include information associated with a portion (such as a start portion) of the first OFF pulse 304A of the sequence of alternating ON and OFF pulses 304 corresponding to the pattern of alternating light pulses. The first OFF threshold value may be a maximum value that may indicate the presence of the OFF pulse pattern of the generated pattern of alternating light pulses. The circuitry 202 may further determine, for each imaging device, an amount of light intensity in the first frame 502 of the plurality of images 110 (such as the first video 402 corresponding to the first set of images 110A captured by the first imaging device 106A). In an embodiment, the circuitry 202 may determine a metric d(a, b), where the value "a", and the value "b" of the metric may be associated with lighting measurements, for example, the light intensity. In one or more embodiments, the circuitry 202 may determine the amount of light intensity based on a maximum likelihood classification method or a polytomous logistic regression (PLR) method. For example, the maximum likelihood classification method may be utilized to determine the amount of light intensity based on the first OFF threshold value, without explicit computation of an exact value of the metric d(a, b). The circuitry 202 may further determine threshold values, such as the first OFF threshold value and a first ON threshold value. The determined threshold values may be utilized to minimize a state classification error. For example, the first ON threshold value ($th_{i,ON}$) may be determined for a metric d(a, $I_{i,ON}$), where $I_{i,ON}$ may represent the amount of light intensity in the frames corresponding to the ON pulse pattern of the pattern of alternating light pulses. The first OFF threshold value ($th_{i,OFF}$) may be determined for a metric d(a, $I_{i,OFF}$), where $I_{i,OFF}$ may represent the amount of light intensity in the frames corresponding to the OFF pulse pattern of the pattern of alternating light pulses.

In an embodiment, the metric d(a, b) may be represented as Euclidean distance and the threshold values may be proportional to standard deviations associated with the lighting measurements. In another embodiment, a logic d($I_f$, $I_{i,OFF}$)<($th_{i,OFF}$) and d($I_f$, $I_{i,ON}$)<($th_{i,OFF}$) may be replaced by a learned classifier to determine the amount of light intensity, where $I_f$ may be a frame of the first video 402 corresponding to the pattern of alternating light pulses.

The circuitry 202 may select, for each imaging device, the first frame 502 in the plurality of images 110, based on a determination that the determined amount of light intensity in the first frame 502 may be less than the determined first OFF threshold value. For example, the first frame 502 of the first video 402 may be selected based on the determination that the amount of light intensity in the first frame 502 may be less than the determined first OFF threshold value. Similarly, a first frame may be determined in each of the second set of images 110B and the Nth set of images 110N of the plurality of images 110, based on the amount of light intensity in the first frame in the second set of images 110B and in the Nth set of images 110N, captured by the second imaging device 106B and the Nth imaging device 106N, respectively.

In an exemplary scenario, the circuitry 202 may select one of an initial frame of a plurality of initial frames in the first video 402. For example, the pattern of alternating light pulses may be captured in the plurality of initial frames of the first video 402. In an example, the plurality of initial frames may correspond to frames between a frame number 130 till a frame number 650. The circuitry 202 may determine the amount of light intensity in the initial frame. In case, the determined amount of light intensity in the initial frame may be less than the determined first OFF threshold value, the circuitry 202 may determine the amount of light intensity in a successive frame (such as a frame that may include the OFF pulse pattern) of the initial frame and a preceding frame (such as a frame that may include the preamble pulse pattern) of the first video 402. The circuitry 202 may select the initial frame as the first frame 502, when the amount of light intensity in the successive frame may be less than the first OFF threshold value and the amount of light intensity in the preceding frame may be more than the first OFF threshold value. The determined second time duration ("D") may provide a high false-positive rejection rate in detection of the first frame 502, thus, providing higher accuracy in temporal synchronization.

In accordance with an embodiment, the circuitry 202 may determine an amount of light intensity in each frame of the plurality of subsequent frames 504 of the determined first frame 502, for each imaging device. The amount of light intensity in each frame of the plurality of subsequent frames 504 may be determined based on the determined first OFF threshold value and the first ON threshold value. For example, the first ON threshold value may be associated with presence of the ON pulse pattern of the pattern of alternating light pulses.

In accordance with an embodiment, the circuitry 202 may further generate, for each imaging device, the counter information 512 based on the determined amount of light intensity in each frame of the plurality of subsequent frames 504. In some embodiments, the circuitry 202 may be further configured to determine, for each imaging device, the set of incremental counter values 514 that may be included in the counter information 512. For example, the circuitry 202 may determine the set of incremental counter values 514 included in the counter information 512 for the first video 402 recorded by the first imaging device 106A.

A number of counter values of the set of incremental counter values 514 may be based on the first positive integer value $q_i$ corresponding to each imaging device of the plurality of imaging devices 106 and the third positive integer value "m". The circuitry 202 may determine the number of counter values of the set of incremental counter values 514 based on equation (4) as follows:

$$c = q_i \times r_i \quad (4)$$

where "c" may represent the number of counter values that may correspond to a length of a counter array (i.e. counter information 512). Further, $C_i[c]$ depicts the set of incremental counter values 514 associated with a particular imaging device (such as the first imaging device 106A), such that "c" may vary from 0 till the determined number of counter values minus one counter value (for example, c ranges from 0 till c-1). The counter index number 516 ("[c]") may be cyclic with a time period of the first positive integer value $q_i$. In an embodiment, $r_i$ may be determined based on equation (5) as follows:

$$r_i = \left\lfloor \frac{mN}{q_i} \right\rfloor \quad (5)$$

Based on the first positive integer value $q_i$ and the third positive integer value "m", the circuitry 202 may determine the number of counter values (such as a length of the counter information 512. For example, the first positive integer value $q_i$ corresponding to the first imaging device 106A may be "6" and the third positive integer value "m" may be "2". In such a case, the number of counter values ("c") of the set of incremental counter values 514 may be determined as "12", based on equations (4) and (5). The description of "N" is provided, for example, in FIG. 3. Thus, the counter information 512 may include the counter index number 516 from "0" till "11", such that the set of incremental counter values 514 may be C[0], C[1], C[2], C[3], . . . , C[11] for each imaging device of the plurality of imaging devices 106.

The generated counter information 512 may indicate a first number of frames of the first set of frames 506 (out of the plurality of subsequent frames 504) corresponding to the OFF pulse pattern of the pattern of alternating light pulses. For example, the first set of frames 506 may include information about the OFF pulse pattern of the pattern of alternating light pulses. The counter information 512 may further indicate a second number of frames of the second set of frames 508 (i.e. out of the plurality of subsequent frames 504) corresponding to the ON pulse pattern of the pattern of alternating light pulses. For example, the second set of frames 508 may include information about the ON pulse pattern of the pattern of alternating light pulses. Each counter value in the set of incremental counter values 514 may correspond to one of the first number of frames of the first set of frames 506 or the second number of frames of the second set of frames 508, for each of the sequence of alternating ON and OFF pulses 304 (i.e. such as first OFF pulse 304A, first ON pulse 304B, second OFF pulse 304C, second ON pulse 304D, and so on).

In an embodiment, the circuitry 202 may be configured to determine the first number of frames of the first set of frames 506 based on the determination that the determined amount of light intensity in the first set of frames 506 may be less than the determined first OFF threshold value and a determination that the counter index number 516 of a corresponding counter value in the set of incremental counter values 514 may be an even number (like c=0, 2, 4 . . . ). In an exemplary scenario, the circuitry 202 may determine the first number of frames of the first set of frames 506 corresponding to the first OFF pulse 304A of the synchronization signal 300. For example, the information about the OFF pulse pattern (such as corresponding to the first OFF pulse 304A) of the pattern of alternating light pulses may be included in the first set of frames 506 in the duration "0" to "2" seconds of the timing graph (i.e. considering the second time duration ("D"), for example, as 2000 msec). The circuitry 202 may further determine the amount of light intensity in each frame of the first set of frames 506 (i.e. related to the first video 402) in the duration "0" to "2" seconds (i.e. duration of the first OFF pulse 304A of the synchronization signal 300).

As shown in FIG. 5, it may be assumed that the first imaging device 106A may initiate capture of the information about the pattern of alternating light pulses (i.e. including sequence of alternating ON and OFF pulses of the synchronization signal 300) after a framing offset 510 from an end of the preamble pulse 302 or from a start of the first OFF pulse 304A. The electronic device 102 may be configured to determine the framing offset 510 for the first imaging device 106A to synchronize captured frames of the first imaging device 106A with captured frames of other imaging devices. Thus, the electronic device 102 may determine the framing offset for each imaging device for the synchronization.

As per FIG. 5, the counter index number 516 may start from "0", such that a first counter value in the set of incremental counter values 514 may be c[0]="0". For the first counter value c[0], the circuitry 202 may determine the first number of frames of the first set of frames 506 between the duration "0" to "2" seconds. The circuitry 202 may determine the amount of light intensity in a frame 506A subsequent of the first frame 502. The circuitry 202 may determine whether the determined amount of light intensity ($I_{i,OFF}$) in the frame 506A may be less than the determined first OFF threshold value ($th_{i,OFF}$). In such a case, if the logic $d(I_f, I_{i,OFF}) < (th_{i,OFF})$, and the counter index number 516 is even (such as the index number "0" for c), then the frame 506A may be counted in the first set of frames 506 aligned with the first OFF pulse 304A between the duration "0" to "2" seconds, such that the first counter value may be incremented by one (i.e. c[0]="1") and the counter index number 516 may remain same (c="0"). Similarly, the circuitry 202 may further select a frame 506B (i.e. next to the frame 506A of the first frame 502) and determine if the logic $d(I_f, I_{i,OFF}) < (th_{i,OFF})$ for the frame 506B and the counter index number 516 is even (such as the index number "0" for c). In such case, the frame 506B may be counted in the first set of frames 506 between the duration "0" to "2" seconds (i.e. such that the first counter value may be further incremented by one (i.e. c[0]="2")) and the counter index number 516 may remain same (c="0"). Similarly, as shown in FIG. 5, a frame 506C may be counted in the first set of frames 506 between the duration "0" to "2" seconds (i.e. duration of the first OFF pulse 304A of the synchronization signal 300) such that the first counter value may be further incremented by one (i.e. c[0]="3")) and the counter index number 516 may remain same (c="0").

In an embodiment, the circuitry 202 may further determine the amount of light intensity for a frame 506D of the first video 402 that may be aligned with a portion of the end of the first OFF pulse 304A and a start of the first ON pulse 304B of the sequence of alternating ON and OFF pulses 304 of the synchronization signal 300 as shown, for example, in FIG. 5. The circuitry 202 may determine the logic $d(I_i I_{i,OFF}) < d(I_i I_{i,ON})$ for the frame 506D that may be aligned with the a portion of the end of the first OFF pulse 304A and the start of the first ON pulse 304B. Based on the determination, that the amount of light intensity associated with the OFF pulse pattern (i.e. in the frame 506D) corresponding to the first OFF pulse 304A is less than the ON pulse pattern (i.e. in the in the frame 506D) corresponding to the first ON pulse 304B, and the counter index number 516 is even (such as the index number "0" for c), the circuitry 202 may count the frame 506D of the first video 402 in the first set of frames 506 between the duration "0" to "2" seconds (i.e. such that the first counter value may be further incremented by one (i.e. c[0]="4")) and the counter index number 516 may remain same (c="0"). Such a determination may indicate that the frame 506D may include a greater portion of the OFF pulse pattern (i.e. corresponding to the first OFF pulse 304A) than the portion of the ON pulse pattern (i.e. corresponding to the first ON pulse 304B) as shown, for example, in FIG. 5. Thus, the circuitry 202 may determine the first number of frames of the first set of frames 506 (i.e. which may be aligned with the first OFF pulse 304A in the duration "0" to "2" seconds) as "4" (i.e. the first counter value, c[0]="4").

In accordance with an embodiment, the circuitry 202 may be further configured to determine, for each imaging device, the first ON threshold value ($th_{i,ON}$) associated with the presence of the ON pulse pattern of the pattern of alternating light pulses. The circuitry 202 may determine the second number of frames of the second set of frames 508 based on a determination that the determined amount of light intensity in the second set of frames 508 may be less than the determined first ON threshold value ($th_{i,ON}$) and a determination that the counter index number 516 of a corresponding counter value in the set of incremental counter values 514 may be an odd number (like c=1, 3, 5 . . . ).

In an exemplary scenario, the circuitry 202 may determine the second number of frames of the second set of frames 508 corresponding to the first ON pulse 304B of the synchronization signal 300. In such scenario, the circuitry 202 may initialize a second counter value in the set of incremental counter values 514 with zero value (i.e. c[1]="0"). The circuitry 202 may further select a frame 508A (i.e. next frame of a last selected frame 506D counted in the counter value c[0]) as shown in FIG. 5.

The circuitry 202 may further determine the amount of light intensity in the selected frame 508A that may include the information about the ON pulse pattern (such as corresponding to the first ON pulse 304B) of the pattern of alternating light pulses of the synchronization signal 300. For example, the circuitry 202 may determine if the determined amount of light intensity ($I_{i,ON}$) in the selected frame 508A is less than the determined first ON threshold value ($th_{i,ON}$). In such a case, if the logic $d(I_i I_{i,ON}) < (th_{i,ON})$ and the counter index number 516 is odd (such as index number "1" for c), then the selected frame 508A may be counted in the second set of frames 508 aligned with the first ON pulse 304B between the duration "2" to "4" seconds (i.e. such that the second first counter value may be incremented by one (i.e. c[1]="1") and the counter index number 516 may remain the same (i.e. c=1). Similarly, the circuitry 202 may determine if the amount of light intensity ($I_{i,ON}$) in the consecutive frames (such as a frame 508B, a frame 508C) to be less than the determined first ON threshold value ($th_{i,ON}$) and as the counter index number 516 is odd ("such as the index number c=1). In such case, the consecutive frames may be counted in the second set of frames 508 in the duration "2" to "4" seconds (i.e. such that the second first counter value may be incremented by one respectively for each consecutive frame (i.e. c[1]="3") and the counter index number 516 may remain the same (i.e. c="1").

In an embodiment, the circuitry 202 may further determine the amount of light intensity for a frame 508D of the first video 402 that may be aligned with a portion of the end of the first ON pulse 304B and a start of the second OFF pulse 304C of the sequence of alternating ON and OFF pulses 304 of the synchronization signal 300 as shown, for example, in FIG. 5. The circuitry 202 may determine the logic $d(I_i I_{i,OFF}) > d(I_i I_{i,ON})$ for the frame 508D that may be aligned with the portion of the end of the first ON pulse 304B and the start of the second OFF pulse 304C. Based on the determination, that the amount of light intensity associated with the ON pulse pattern (i.e. in the frame 508D) corresponding to the first ON pulse 304B is less than the OFF pulse pattern (i.e. in the frame 508D) corresponding to the second OFF pulse 304C, and the counter index number 516 is odd (such as the index number "1" for c), the circuitry 202 may count the frame 508D of the first video 402 in the second set of frames 508 between the duration "2" to "4" seconds (i.e. such that the second counter value may be further incremented by one (i.e. c[1]="4")). Such a determination may indicate that the frame 508D may include a greater portion of the ON pulse pattern (i.e. corresponding to the first ON pulse 304B) than the portion of the OFF pulse pattern (i.e. corresponding to the second OFF pulse 304C) as shown, for example, in FIG. 5. In further scenario, when a frame may include a greater portion of the OFF pulse pattern than the portion of the ON pulse pattern, the circuitry 202 may count that frame (i.e. such as last frame corresponding to the second ON pulse 304C) in a next counter value. Thus, the circuitry 202 may determine the second number of frames of the second set of frames 508 aligned with the first ON pulse 304B between the duration "2" to "4" seconds as the second counter value (i.e. c[1]="4").

Furthermore, the circuitry 202 may determine the first number of frames of the first set of frames 506 or the second number of frames of the second set of frames 508 corresponding to each counter index number 516 (such c="0" to "11") for the first imaging device 106A. Each of the first number of frames and the second number of frames may correspond to a particular counter value in the set of incremental counter values 514 for the first video 402 captured by the first imaging device 106A. For example, the set of incremental counter values 514 for the index numbers c="0" to "11" for the captured first video 402 (i.e. aligned with the sequence of alternating ON and OFF pulses 304 of the synchronization signal 300) may be "4", "4", "5", "4", "4", "4" . . . so on, as shown, for example, in FIG. 5) based on the number of frames counted with respect to each ON or OFF pulse of the synchronization signal 300. The circuitry 202 may further stop a determination of the count of the first number of frames of the first set of frames 506 or the second number of frames of the second set of frames 508, after the determination of the counter value c[11].

By way of example and not limitation, the set of incremental counter values 514 may be determined based on logics, as follows:

```
while c < q_i × r_i
{
    {
    if (d(l_f, l_{i,on}) < th_{i,on} and c is odd) or (d(l_f, l_{i,off}) < th_{i,off} and c is even)
        → no change
    else if (d(l_f, l_{i,off}) > d(l_f, l_{i,on}) and c is odd) or (d(l_f, l_{i,off}) <
d(l_f, l_{i,on}) and c is even)
        → no change
    else → c = c + 1;
    }
    if (c == q_i × r_i) or (c == q_i × r_i − 1 and C_i[c] == n_i + 1) → stop;
    else → C_i[c] = C_i[c] + 1, f = f + 1;
}
``` where "i" may represent a particular imaging device of the plurality of imaging devices 106, "c" may be the counter index number 516, and $C_i[c]$ may be a particular counter value of the set of incremental counter values 514 for the particular imaging device, and "f" may represent current frame under processing.

Similarly, the circuitry 202 may further determine, for each imaging device, the first number of frames of the first set of frames 506 and the second number of frames of the second set of frames 508 corresponding to each counter index number 516 (i.e. such that the set of incremental counter values 514 may be determined based on the set of parameters related to each imaging device). For example, the set of incremental counter values 514 may be determined based on the information (i.e. light intensity in each frame) about the pattern of alternating light pulses which may be generated based on the synchronization signal 300 for which the second time duration ("D") i calculated based on the set of parameters as described for example, in FIG. 3. Thus, the counter information 512 associated with each imaging device of the plurality of imaging devices 106 may be generated based on the corresponding set of incremental counter values 514 determined for the captured frames related to the synchronization signal 300 (i.e. illuminated as the pattern of alternating light pulses by the one or more first lighting devices 104).

In accordance with an embodiment, the circuitry 202 may be further configured to determine a base index value of the set of incremental counter values 514, based on each counter value in the set of incremental counter values 514, the first positive integer value ($q_i$) and the third positive integer value (m). The base index value of the counter value may be determined based on equations (6) and (7) as follows:

$$c^* = \underset{c<q_i}{\operatorname{argmin}} Ci[c] \qquad (6)$$

where c* is the base index value of the set of incremental counter values 514, and "c" may vary from 0 to 5 (based on $q_i=6$ for the first imaging device 106A).

Further, a value of $C_i[c]$ for equation 6 may be calculated based on the following equation:

$$C_i[c] = \Sigma_{r=0}^{r_i-1} C_i[c+rq_i] \qquad (7)$$

Utilizing equation 5 i.e.

$$r_i = \left\lfloor \frac{mN}{q_i} \right\rfloor, r_i = (2*6)/6 = 2.$$

The circuitry 202 may utilize the equation (5) and equation (7) to compute a value of $C_i[c]$:

For example, for $r_i=2$, the equation (7) (i.e. $C_i[c]=\Sigma_0^1 C_i[c+rq_i]$) may be represented as an equation (8) as follows:

$$C_i[c]=C_i(c+0)+C_i(c+q_i) \qquad (8)$$

where "c" may vary from "0" to "5" and $q_i$="6" (for the first imaging device 106A). Thus, based on equation (8), the circuitry 202 may determine multiple values of $C_i[c]$, as follows:

$$C_i[0]=C_i[0]+C_i[6]; C_i[1]=C_i[1]+C_i[7]; \ldots C_i[5]=C_i[5]+C_i[11] \qquad (9)$$

Based on equation (9), the circuitry 202 may further apply the argmin function on the $C_i[c]$ as per equation (6), to determine the base index value (c*) of the set of incremental counter values 514. In an embodiment, when multiple values of the base index value (c*) is determined, one or more signal filtering methods may be utilized to determine a single base index value (c*). In an embodiment, a higher number of first number of frames corresponding to the first set of frames 506 or the second number of frames corresponding to the second set of frames 508 may be equal to the base index value (c*), (c*+1) or (c*−1). In an example, the value of the function argmin $C_i[c]$ may be any value of "c" that may minimize the function $C_i[c]$. For example, the base index value (c*) i.e. the function argmin $C_i[c]$ may be a value 0, 1, 2, 3, 4 or 5, which may be determined based on the determined set of incremental counter values 514 as shown in FIG. 5.

The circuitry 202 may be further configured to determine a resultant index value of the set of incremental counter values 514, based on the determined base index value (c*) of the set of incremental counter values 514 and the determined amount of light intensity in each frame of the plurality of subsequent frames 504. The resultant index value may be determined by an equation (10) as follows:

$$c^{**} = \begin{cases} c^* + \dfrac{b-a}{2}, & \text{if } c^* + \dfrac{b-a}{2} \geq 0 \\ c^* + \dfrac{b-a}{2} + q_i, & \text{otherwise} \end{cases} \qquad (10)$$

where c** is the resultant index value.

The value of "a" may be a leftmost index where $C_i[c^*-a]=C_i[e]$. The value of "b" may be a rightmost index where $C_i[c^*+b]=C_i[e]$, and a≥0, and b≥0. Further, the index may be cyclic about the value of "$q_i$". Thus, $C_i[-1]=C_i[-1+q_i]$, $C_i[-2]=C_i[-2+q_i]$, and so forth. In an exemplary scenario, if the base index value (c*)=1, $C_i[c^*=1]=C_i[c^*-1]=C_i[c^*-2]=C_i[c^*-3]=C_i[c^*-4]<C_i[c^*-5]$, and the value of "a"=4 and the value of "b"=0. In such a case, by use of equation 10, the resultant index value $$(c^{**}) = c^* + \frac{b-a}{2} + q_i = 1 + \frac{0-4}{2} + 6 = 5.$$

Thus, the value of c**=5.

The circuitry 202 may be further configured to determine the framing offset 510 for each imaging device, based on the generated counter information 512 and the determined set of parameters associated with each imaging device of the plurality of imaging devices 106. In some embodiments, the circuitry 202 may determine the framing offset 510 based on the resultant index value (c**), the frame rate of each imaging device and the first positive integer value included in the set of parameters. The circuitry 202 may determine the framing offset 510 utilizing an equation (11) as follows:

$$\Delta_t = p_i(c^{**} + \frac{1}{2}) \tag{11}$$

where $\Delta_t$ is the framing offset 510 and $p_i$ may be determined as per equation (2) based on the first positive integer value ($q_i$) and time period of each frame ($t_i$). In an exemplary scenario, the integer $p_i$=80, the base index value ($c^*$)=1, a=4, b=0. In such scenario, for example, the circuitry 202 may determine the resultant index value as $c^{**}$="5" and determine the framing offset 510 ($\Delta_t$) based on equation (11) as 440 msec. The framing offset 510 (i.e. sub-frame timing) may be utilized to determine an exact and accurate position of the end of the preamble pulse 302 or the start of the sequence of alternating ON and OFF pulses 304 captured in the first frame 502 of the first video 402 (i.e. captured by the first imaging device 106A). Thus, as described in FIG. 5, the disclosed electronic device 102 may determine the framing offset 510 for the first imaging device 106A, based on the information (i.e. amount of light intensities) about the pattern of alternating light pulses (i.e. illuminated by the first lighting device 104A based on the generated synchronization signal 300) captured in the first set of images 110A. Similarly, for the second set of images 110B captured by the second imaging device 106B and the Nth set of images 110N captured by the Nth imaging device 106N, the circuitry 202 may determine a respective framing offset. The framing offset 510 for the first imaging device 106A may indicate a sub-frame timing delay of the first imaging device 106A to initiate the capture of the first video 402 (i.e. including information about the pattern of alternating light pulses). Similarly, for each imaging device, the electronic device 102 may determine a timing delay (i.e. at sub-frame level as a framing offset) of the respective imaging device to initiate a capture of a corresponding video (i.e. including information about the pattern of alternating light pulses generated based on the generated synchronization signal 300).

Based on the determined framing offset 510 (i.e. capture timing offset at sub-frame level) for each imaging device of the plurality of imaging devices 106, the circuitry 202 may synchronize the acquired plurality of images 110 or corresponding video. In accordance with an embodiment, the circuitry 202 may temporally synchronize the plurality of images 110 captured by the plurality of imaging devices 106, based on an automatic alignment of the plurality of images 110 corresponding to the framing offset 510 determined for each imaging device. Based on the determination of the framing offset 510 as a sub-frame timing for each imaging device, the disclosed electronic device 102 may achieve the timing accuracy of the alignment of images at a sub-frame level which may further provide synchronization of the captured images with an accuracy, which may be better than the accuracy achieved by alignment of images at framelevel. In an exemplary scenario, the framing offset 510 of the first imaging device 106A (i.e. with frame duration as 480 msec) may be 440 msec, the framing offset 510 of the second imaging device 106B (i.e. with frame duration as 480 msec) may be 120 msec, and the framing offset 510 of the Nth imaging device 106N (i.e. with a frame duration as 375 msec) may be 192.5 msec. Based on the determined framing offset 510 of each imaging device, the circuitry 202 may align the plurality of images 110. For example, the circuitry 202 may temporally align the first frame 502 of the first video 402 (such as the first set of images 110A), a first frame of the second set of images 110B and a first frame of the Nth set of images 110N, based on the determined respective framing offset (i.e. a sub-frame level timing). Similarly, the circuitry 202 may temporally align or synchronize each frame captured by each imaging device, based on each framing offset determined for each imaging device, respectively. Due to the synchronization or alignment of images (i.e. captured by multiple imaging devices from different viewpoints) performed by the disclosed electronic device 102 based on the determined sub-frame level timings, different complicated multi-view applications (such as, scene reconstruction, augmented reality (AR) or virtual reality (VR) content generation, three-dimensional (3D) object detection, motion capturing, sensor fusion/integration in autonomous vehicles, and/or accurate frame timestamp generation for video surveillance) may achieve high accuracy in the temporal synchronization of images.

In some embodiments, the circuitry 202 may further determine an end of the ON pulse pattern corresponding to the Nth ON pulse 304N (i.e. shown in FIG. 3) of the sequence of alternating ON and OFF pulses 304 in the first video 402 (including the first set of images 110A). The circuitry 202 may further determine the end of the ON pulse pattern corresponding to the Nth ON pulse 304N of the sequence of alternating ON and OFF pulses 304 in the second set of images 110B and in the Nth set of images 110N, respectively. Based on the determined end of the ON pulse pattern corresponding to the Nth ON pulse 304N and the determined framing offset 510, the circuitry 202 may temporally synchronize the plurality of images 110 that may be captured by the plurality of imaging devices 106 and include the information about the pattern of alternating light pulses generated based on the synchronization signal 300).

In an embodiment, the circuitry 202 of the electronic device may determine the second time duration ("D") of each pulse of the sequence of alternating ON and OFF pulses 304 such that the determined framing offset 510 may be utilized to minimize error associated with temporal quantization (or frame sampling) of each video (such as the plurality of images 110). Based on the framing offset 510, accurate interpolated data and extrapolated data may be collected from the plurality of images 110 captured by each imaging device of the plurality of imaging devices 106.

Figure 6:
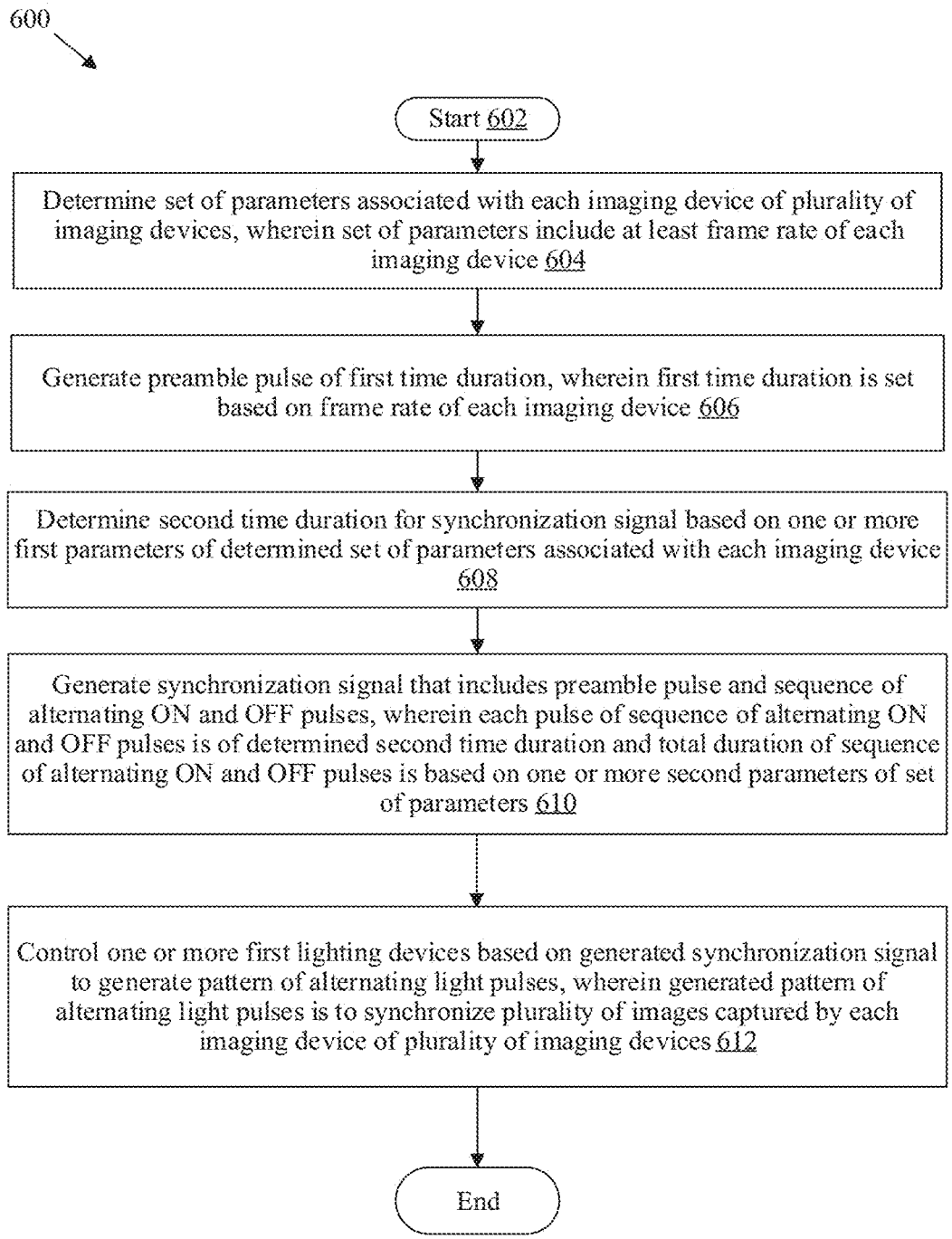
FIG. 6 is a flowchart that illustrates an exemplary method for generation of a synchronization signal, in accordance with an embodiment of the disclosure.

FIG. 6 is a flowchart that illustrates an exemplary method for generation of a synchronization signal, in accordance with an embodiment of the disclosure. FIG. 6 is described in conjunction with elements from FIGS. 1, 2, 3, 4 and 5. With reference to FIG. 6, there is shown a flowchart 600. The operations of the flowchart 600 may be executed by a computing system, such as the electronic device 102 or the circuitry 202. The operations may start at 602 and proceed to 604. The operations of the flowchart 600 may be performed for the generation of the synchronization signal 300 and control of the one or more first lighting devices 104 based on the synchronization signal 300, to further achieve the synchronization of images captured by the plurality of imaging devices 106.

At 604, the set of parameters associated with each imaging device of the plurality of imaging devices 106 may be determined, where the set of parameters include at least frame rate of each imaging device. In accordance with an embodiment, the circuitry 202 may be configured to determine the set of parameters associated with each imaging device of the plurality of imaging devices 106. The set of parameters may include at least a frame rate of each imaging device. The set of parameters are described, for example, in FIGS. 3 and 5.

At 606, the preamble pulse 302 of the first time duration ("T1") may be generated, where the first time duration is set based on a frame rate of each imaging device. In accordance with an embodiment, the circuitry 202 may be configured to generate the preamble pulse 302 of the first time duration. The first time duration may be set based on the frame rate of each imaging device as described, for example, in FIG. 3.

At 608, the second time duration ("D") for the synchronization signal 300 may be determined, based on the one or more first parameters of the determined set of parameters associated with each imaging device. In accordance with an embodiment, the circuitry 202, may be configured to determine the second time duration for the synchronization signal 300, based on the one or more first parameters of the determined set of parameters associated with each imaging device. The second time duration ("D") for the synchronization signal 300 and the one or more first parameters are described, for example, in FIG. 3.

At 610, the synchronization signal 300, that may include the preamble pulse 302 of the first time duration and the sequence of alternating ON and OFF pulses 304, may be generated. In accordance with an embodiment, the circuitry 202 may be configured to generate the synchronization signal 300 that may include the preamble pulse 302 of the first time duration and the sequence of alternating ON and OFF pulses 304. Each pulse of the sequence of alternating ON and OFF pulses 304 may be of the second time duration ("D"). The total duration ("T2") of the sequence of alternating ON and OFF pulses 304 may be based on the one or more second parameters of the set of parameters are described, for example, in FIG. 3.

At 612, the one or more first lighting devices 104 may be controlled based on the generated synchronization signal 300 to generate the pattern of alternating light pulses. In accordance with an embodiment, the circuitry 202 may be configured to control the one or more first lighting devices 104 based on the generated synchronization signal 300 to generate the pattern of alternating light pulses as described, for example, in FIG. 3. The generated pattern of alternating light pulses is to synchronize the plurality of images 110 captured by each imaging device of the plurality of imaging devices 106 as described, for example, in FIG. 5.

Although the flowchart 600 is illustrated as discrete operations, such as 604, 606, 608, 610, and 612, the disclosure is not so limited. Accordingly, in certain embodiments, such discrete operations may be further divided into additional operations, combined into fewer operations, or eliminated, depending on the particular implementation without detracting from the essence of the disclosed embodiments.

Figure 7:
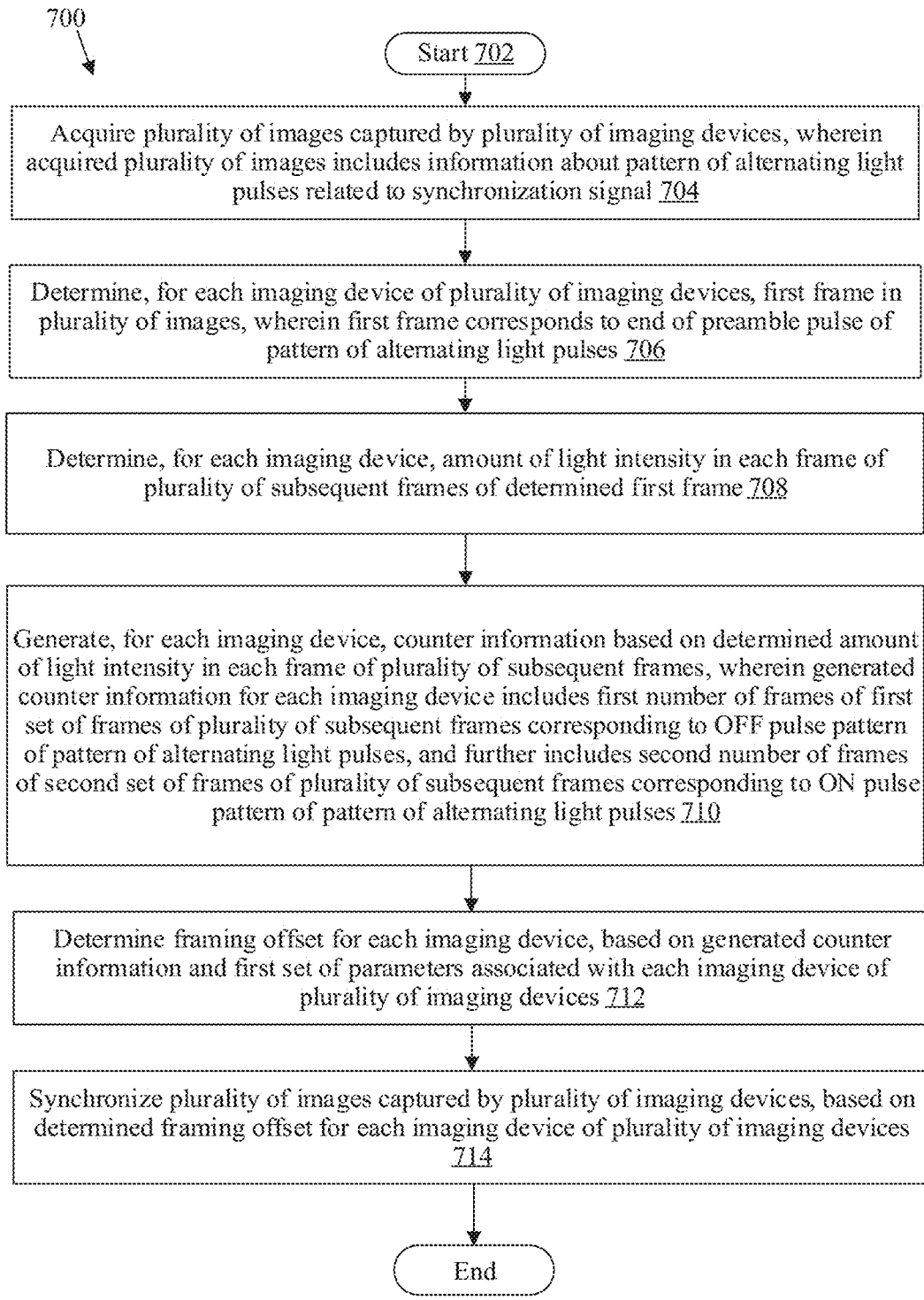
FIG. 7 is a flowchart that illustrates an exemplary method for temporal synchronization of videos, in accordance with an embodiment of the disclosure.

FIG. 7 is a flowchart that illustrates an exemplary method for temporal synchronization of videos, in accordance with an embodiment of the disclosure. FIG. 7 is described in conjunction with elements from FIGS. 1, 2, 3, 4, 5 and 6. With reference to FIG. 7, there is shown a flowchart 700. The operations of the flowchart 700 may be executed by a computing system, such as the electronic device 102 or the circuitry 202. The operations may start at 702 and proceed to 704. The operations of the flowchart 700 may be performed to temporally synchronize the plurality of images 110 captured by the plurality of imaging devices 106, where the plurality of images 110 includes the information about the pattern of alternating light pulses generated based on the synchronization signal 300.

At 704, the plurality of images 110 captured by the plurality of imaging devices 106 may be acquired, where the acquired plurality of images 110 may include information about the pattern of alternating light pulses related to the synchronization signal 300. In accordance with an embodiment, the circuitry 202 may be configured to acquire the plurality of images 110 captured by the plurality of imaging devices 106. The acquired plurality of images 110 may include information about the pattern of alternating light pulses related to the synchronization signal 300 as described, for example, in FIG. 5. The plurality of images 110 may include the first set of images 110A captured by the first imaging device 106A, the second set of images 1108 captured by the second imaging device 106B, and so on.

At 706, for each imaging device of the plurality of imaging devices 106, the first frame 502 may be determined in the plurality of images 110, where the first frame 502 may correspond to the end of the preamble pulse 302 of the pattern of alternating light pulses. In accordance with an embodiment, the circuitry 202 may be configured to determine, for each imaging device of the plurality of imaging devices 106, the first frame 502 in the plurality of images 110 (for example in the first set of images 110A for the first imaging device 106A) as described, for example, in FIG. 5.

At 708, for each imaging device, the amount of light intensity may be determined in each frame of the plurality of subsequent frames 504 of the determined first frame 502. In accordance with an embodiment, the circuitry 202 may be configured to determine, for each imaging device, the amount of light intensity in each frame of the plurality of subsequent frames 504 of the determined first frame 502 as described, for example, in FIG. 5.

At 710, for each imaging device, the counter information 512 may be generated based on the determined amount of light intensity in each frame of the plurality of subsequent frames 504. In accordance with an embodiment, the circuitry 202 may be configured to generate, for each imaging device, the counter information 512 based on the determined amount of light intensity in each frame of the plurality of subsequent frames 504. The generated counter information 512 for each imaging device may include a first number of frames of the first set of frames 506 (i.e. out of the plurality of subsequent frames 504) corresponding to the OFF pulse pattern of the pattern of alternating light pulses, and may further include a second number of frames of a second set of frames 508 (i.e. out of the plurality of subsequent frames 504) corresponding to the ON pulse pattern of the pattern of alternating light pulses as described, for example, in FIG. 5.

At 712, the framing offset 510 may be determined for each imaging device, based on the generated counter information 512 and the set of parameters associated with each imaging device of the plurality of imaging devices 106. In accordance with an embodiment, the circuitry 202 may be configured to determine the framing offset 510 for each imaging device, based on the generated counter information 512 and the set of parameters associated with each imaging device of the plurality of imaging devices 106 as described, for example, in FIG. 5.

At 714, the plurality of images 110 captured by the plurality of imaging devices 106 may be synchronized, based on the determined framing offset 510 for each imaging device of the plurality of imaging devices 106. In accordance with an embodiment, the circuitry 202 may be configured to synchronize the plurality of images 110 captured by the plurality of imaging devices 106, based on the determined framing offset 510 for each imaging device of the plurality of imaging devices 106 as described, for example, in FIG. 5. The control may pass to end.

Although the flowchart 700 is illustrated as discrete operations, such as 704, 706, 708, 710, 712, and 714, the disclosure is not so limited. Accordingly, in certain embodiments, such discrete operations may be further divided into additional operations, combined into fewer operations, or eliminated, depending on the particular implementation without detracting from the essence of the disclosed embodiments.

Figure 8:
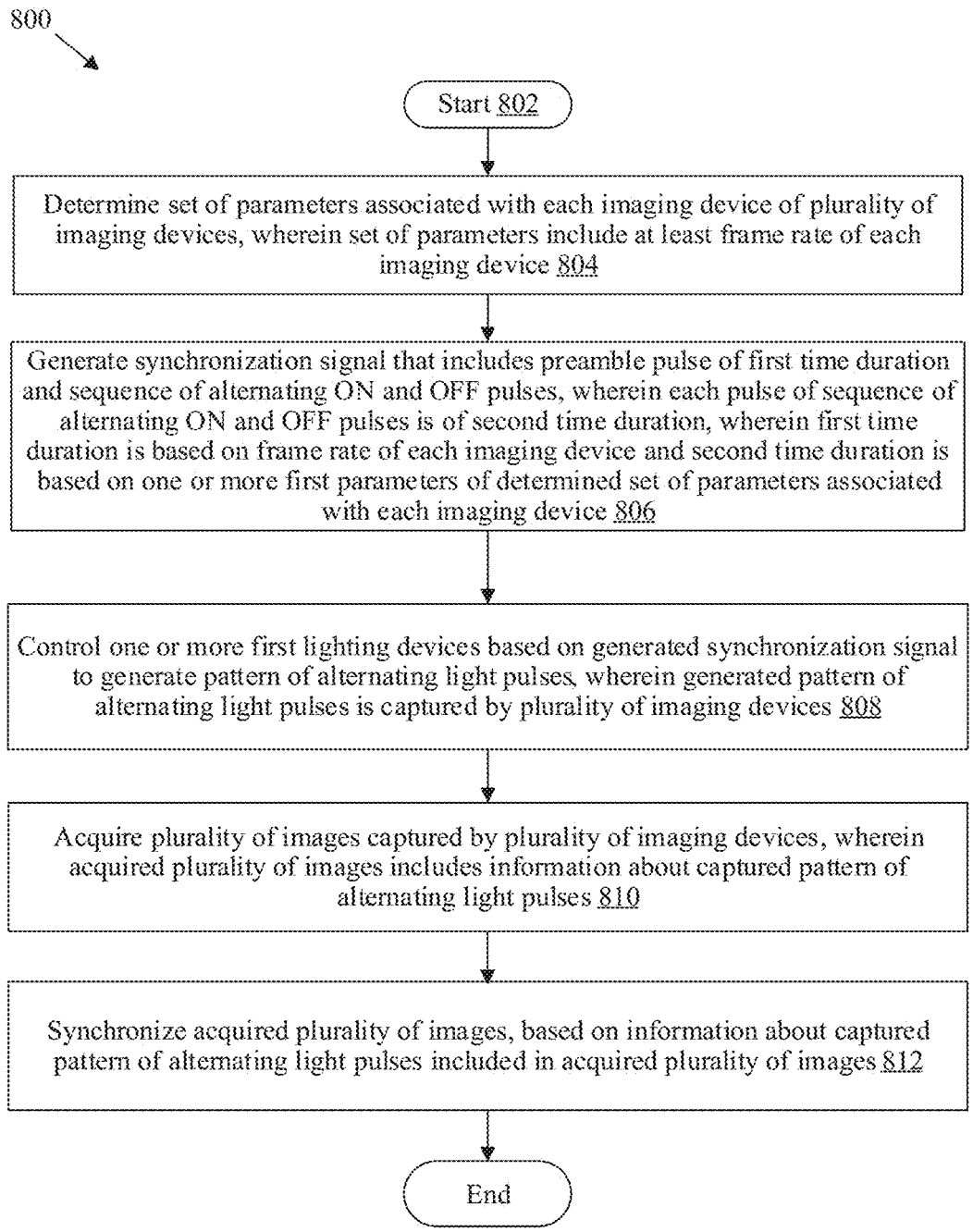
FIG. 8 is a flowchart that illustrates an exemplary method for generation of synchronization signal and for temporal synchronization of videos, in accordance with an embodiment of the disclosure.

FIG. 8 is a flowchart that illustrates an exemplary method for generation of synchronization signal and for temporal synchronization of videos, in accordance with an embodiment of the disclosure. FIG. 8 is described in conjunction with elements from FIGS. 1, 2, 3, 4, 5, 6 and 7. With reference to FIG. 8, there is shown a flowchart 800. The operations of the flowchart 800 may be executed by a computing system, such as the electronic device 102 or the circuitry 202. The operations may start at 802 and proceed to 804.

At 804, the set of parameters associated with each imaging device of the plurality of imaging devices 106 may be determined, where the set of parameters may include at least a frame rate of each imaging device. In accordance with an embodiment, the circuitry 202 may be configured to determine the set of parameters associated with each imaging device of the plurality of imaging devices 106 as described, for example, in FIG. 3.

At 806, the synchronization signal 300, that may include the preamble pulse 302 of the first time duration ("T1") and the sequence of alternating ON and OFF pulses 304, may be generated, where each pulse of the sequence of alternating ON and OFF pulses 304 may be of the second time duration ("D"). In accordance with an embodiment, the circuitry 202 may be configured to generate the synchronization signal 300 that may include the preamble pulse 302 of the first time duration ("T1") and the sequence of alternating ON and OFF pulses 304. The first time duration may be based on the frame rate of each imaging device and the second time duration may be based on one or more first parameters of the determined set of parameters associated with each imaging device as described, for example, in FIG. 3.

At 808, the one or more first lighting devices 104 may be controlled based on the generated synchronization signal 300 to generate the pattern of alternating light pulses, where the generated pattern of alternating light pulses may be captured by the plurality of imaging devices 106. In accordance with an embodiment, the circuitry 202 may be configured to control the one or more first lighting devices 104 based on the generated synchronization signal 300 to generate the pattern of alternating light pulses as described, for example, in FIGS. 3 and 5.

At 810, the plurality of images 110 captured by the plurality of imaging devices 106 may be acquired, where the acquired plurality of images 110 may include information about the captured pattern of alternating light pulses. In accordance with an embodiment, the circuitry 202 may be configured to acquire the plurality of images 110 captured by the plurality of imaging devices 106 as described, for example, in FIGS. 3-5.

At 812, the acquired plurality of images 110 may be synchronized, based on the information about the captured pattern of alternating light pulses included in the acquired plurality of images 110. In accordance with an embodiment, the circuitry 202 may be configured to synchronize the acquired plurality of images 110, based on the information about the captured pattern of alternating light pulses included in the acquired plurality of images 110 as described, for example, in FIG. 5. The control may pass to end.

Although the flowchart 800 is illustrated as discrete operations, such as 804, 806, 808, 810, and 812, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium having stored thereon, computer-executable instructions that when executed by an electronic device (the electronic device 102) causes the electronic device 102 to execute operations. The operations may include determination of a set of parameters associated with each imaging device of a plurality of imaging devices (such as the plurality of imaging devices 106). The set of parameters may include at least a frame rate of each imaging device. The operations may further include generation of a synchronization signal (such as the synchronization signal 300) that may include a preamble pulse (such as the preamble pulse 302) of a first time duration (such as the first time duration "T1") and a sequence of alternating ON and OFF pulses (such as the sequence of alternating ON and OFF pulses 304). Each pulse of the sequence of alternating ON and OFF pulses 304 may be of a second time duration (such as the second time duration "D"). The first time duration "T1" may be based on the frame rate of each imaging device and the second time duration "D" may be based on one or more first parameters of the determined set of parameters associated with each imaging device. The operations may further include control of one or more first lighting devices (such as the one or more first lighting devices 104) based on the generated synchronization signal 300 to generate a pattern of alternating light pulses. The generated pattern of alternating light pulses may be captured by the plurality of imaging devices 106. The operations may further include acquisition of a plurality of images (such as the plurality of images 110) captured by the plurality of imaging devices 106. The acquired plurality of images 110 may include information about the captured pattern of alternating light pulses. The operations may further include synchronization of the acquired plurality of images 110, based on the information about the captured pattern of alternating light pulses included in the acquired plurality of images 110.

Exemplary aspects of the disclosure may include an electronic device (such as the electronic device 102). The electronic device 102 may include circuitry (such as the circuitry 202) that may be configured to determine a set of parameters associated with each imaging device of a plurality of imaging devices (such as the plurality of imaging devices 106). The set of parameters may include at least a frame rate of each imaging device. The circuitry 202 may be further configured to generate a synchronization signal (such as the synchronization signal 300) that may include a preamble pulse (such as the preamble pulse 302) of a first time duration (such as the first time duration "T1") and a sequence of alternating ON and OFF pulses (such as the sequence of alternating ON and OFF pulses 304). Each pulse of the sequence of alternating ON and OFF pulses 304 may be of a second time duration (such as the second time duration "D"). The first time duration T1 may be based on the frame rate of each imaging device and the second time duration "D" may be based on one or more first parameters of the determined set of parameters associated with each imaging device. The circuitry 202 may be further configured to control one or more first lighting devices (such as the one or more first lighting devices 104) based on the generated synchronization signal 300 to generate a pattern of alternating light pulses. The generated pattern of alternating light pulses may be captured by the plurality of imaging devices 106. The circuitry 202 may be further configured to acquire a plurality of images (such as the plurality of images 110) captured by the plurality of imaging devices 106. The acquired plurality of images 110 may include information about the captured pattern of alternating light pulses. The circuitry 202 may be further configured to synchronize the acquired plurality of images 110, based on the information about the captured pattern of alternating light pulses included in the acquired plurality of images 110.

In accordance with an embodiment, the determined set of parameters may further include a first positive integer value and a second positive integer value corresponding to each imaging device of the plurality of imaging devices 106. The circuitry 202 may be further configured to determine the first positive integer value and the second positive integer value based on the corresponding frame rate of each imaging device of the plurality of imaging devices 106.

In accordance with an embodiment, the circuitry 202 may be further configured to determine the second time duration of each pulse of the synchronization signal 300 based on the frame rate, the determined first positive integer value, and the determined second positive integer value associated with each imaging device of the plurality of imaging devices 106. Each of the determined first positive integer value and the determined second positive integer value may correspond to the one or more first parameters. In accordance with an embodiment, the total duration ("T2") of the sequence of alternating ON and OFF pulses 304 of the synchronization signal 300 may be based on one or more second parameters of the determined set of parameters.

In accordance with an embodiment, the determined set of parameters may further include a third positive integer value that may correspond to the one or more second parameters. The circuitry 202 may be further configured to determine the total duration of the sequence of alternating ON and OFF pulses 304 of the synchronization signal 300 based on the determined first positive integer value and the third positive integer value. In accordance with an embodiment, the one or more first parameters of the determined set of parameters may be different from the one or more second parameters of the determined set of parameters.

In accordance with an embodiment, the circuitry 202 may be further configured to determine, for each imaging device of the plurality of imaging devices 106, a first frame (such as the first frame 502) in the plurality of images 110. The first frame 502 may correspond to an end of a preamble pulse (such as the preamble pulse 302) of the pattern of alternating light pulses. The circuitry 202 may be further configured to determine, for each imaging device, an amount of light intensity in each frame of a plurality of subsequent frames (such as the plurality of subsequent frames 504) of the determined first frame 502.

The circuitry 202 may be further configured to generate, for each imaging device, counter information (such as the counter information 512) based on the determined amount of light intensity in each frame of the plurality of subsequent frames 504. The generated counter information 512 for each imaging device may include a first number of frames of a first set of frames (such as the first set of frames 506), of the plurality of subsequent frames 504, corresponding to an OFF pulse pattern of the pattern of alternating light pulses, and may further include a second number of frames of a second set of frames (such as the second set of frames 508), of the plurality of subsequent frames 504, corresponding to an ON pulse pattern of the pattern of alternating light pulses. The circuitry 202 may be further configured to determine a framing offset (such as the framing offset 510) for each imaging device, based on the generated counter information 512 and the set of parameters associated with each imaging device of the plurality of imaging devices 106. The circuitry 202 may be further configured to synchronize the plurality of images 110 captured by the plurality of imaging devices 106, based on the determined framing offset 510 for each imaging device of the plurality of imaging devices 106.

In accordance with an embodiment, the circuitry 202 may be further configured to determine, for each imaging device, a first OFF threshold value associated with presence of the OFF pulse pattern of the pattern of alternating light pulses. The circuitry 202 may further determine, for each imaging device, an amount of light intensity in the first frame 502 of the plurality of images 110. The circuitry 202 may select, for each imaging device, the first frame 502 in the plurality of images 110, based on a determination that the determined amount of light intensity in the first frame 502 is less than the determined first OFF threshold value.

In accordance with an embodiment, the circuitry 202 may be further configured to determine, for each imaging device, the set of incremental counter values 514 included in the counter information 512. The number of counter values of the set of incremental counter values 514 may be based on a first positive integer value corresponding to each imaging device of the plurality of imaging devices 106 and a third positive integer value. Each counter value in the set of incremental counter values 514 may correspond to one of the first number of frames or the second number of frames of the plurality of subsequent frames 504.

In accordance with an embodiment, the circuitry 202 may be further configured to determine the first number of frames of the first set of frames 506 based on a determination that the determined amount of light intensity in the first set of frames 506 may be less than the determined first OFF threshold value and a determination that the counter index number 516 of the corresponding counter value in the set of incremental counter values 514 may be the even number.

In accordance with an embodiment, the circuitry 202 may be further configured to determine, for each imaging device, a first ON threshold value associated with presence of the ON pulse pattern of the pattern of alternating light pulses. The circuitry 202 may further determine the second number of frames of the second set of frames 508 based on a determination that the determined amount of light intensity in the second set of frames 508 may be less than the determined first ON threshold value and a determination that the counter index number 516 of the corresponding counter value in the set of incremental counter values 514 may be the odd number.

In accordance with an embodiment, the circuitry 202 may be further configured to determine the base index value of the set of incremental counter values 514, based on each counter value in the set of incremental counter values 514, the first positive integer value and the third positive integer value. The circuitry 202 may further determine the resultant index value of the set of incremental counter values 514, based on the determined base index value of the set of incremental counter values 514 and the determined amount of light intensity in each frame of the plurality of subsequent frames 504. The circuitry 202 may further determine the framing offset 510 for each imaging device, based on the resultant index value of the set of incremental counter values 514 included in the generated counter information 512, the frame rate of each imaging device and the first positive integer value included in the set of parameters associated with each imaging device of the plurality of imaging devices 106.

In accordance with an embodiment, the circuitry 202 may be further configured to temporally synchronize the plurality of images 110 captured by the plurality of imaging devices 106, based on an alignment of the plurality of images 110 corresponding to the framing offset 510 determined for each imaging device.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. An electronic device, comprising:
  circuitry communicatively coupled to a plurality of imaging devices and one or more first lighting devices, wherein the circuitry is configured to:
    determine a set of parameters associated with each imaging device of the plurality of imaging devices, wherein the set of parameters includes a frame rate of each imaging device of the plurality of imaging devices;
    generate a synchronization signal that includes a preamble pulse of a first time duration and a sequence of alternating ON and OFF pulses, wherein
      each pulse of the sequence of alternating ON and OFF pulses is of a second time duration,
      the first time duration of the preamble pulse is based on the frame rate of a first imaging device of the plurality of imaging devices and the frame rate of a second imaging device of the plurality of imaging devices, and
      the second time duration is based on one or more first parameters of the determined set of parameters associated with each imaging device of the plurality of imaging devices;
    control the one or more first lighting devices based on the generated synchronization signal to generate a pattern of alternating light pulses, wherein the generated pattern of alternating light pulses is captured by the plurality of imaging devices;
    acquire a plurality of images captured by the plurality of imaging devices, wherein the acquired plurality of images includes information about the captured pattern of alternating light pulses;
    determine, for each imaging device of the plurality of imaging devices, a first frame in the acquired plurality of images, wherein the first frame corresponds to an end of a preamble pulse of the captured pattern of alternating light pulses;
    determine, for each imaging device of the plurality of imaging devices, an amount of light intensity in each frame of a plurality of subsequent frames of the determined first frame;
    generate, for each imaging device of the plurality of imaging devices, counter information based on the determined amount of light intensity in each frame of the plurality of subsequent frames, wherein
      the generated counter information for each imaging device of the plurality of imaging devices includes:
        a first number of frames of a first set of frames corresponding to an OFF pulse pattern of the captured pattern of alternating light pulses, and
        a second number of frames of a second set of frames corresponding to an ON pulse pattern of the captured pattern of alternating light pulses, and
      the plurality of subsequent frames includes the first set of frames and the second set of frames;
    determine a framing offset for each imaging device of the plurality of imaging devices, based on the generated counter information and the determined set of parameters associated with each imaging device of the plurality of imaging devices; and
    synchronize the acquired plurality of images, based on the determined framing offset of each imaging device of the plurality of imaging devices.

2. The electronic device according to claim 1, wherein the determined set of parameters further includes a first positive integer value and a second positive integer value corresponding to each imaging device of the plurality of imaging devices, and
the circuitry is further configured to determine the first positive integer value and the second positive integer value based on the frame rate of each imaging device of the plurality of imaging devices.

3. The electronic device according to claim 2, wherein the circuitry is further configured to determine the second time duration of each pulse of the synchronization signal based on the frame rate, the determined first positive integer value, and the determined second positive integer value associated with each imaging device of the plurality of imaging devices, and each of the determined first positive integer value and the determined second positive integer value corresponds to the one or more first parameters.

4. The electronic device according to claim 2, wherein a total duration of the sequence of alternating ON and OFF pulses of the synchronization signal is based on one or more second parameters of the determined set of parameters.

5. The electronic device according to claim 4, wherein
the determined set of parameters further includes a third positive integer value that corresponds to the one or more second parameters, and
the circuitry is further configured to determine the total duration of the sequence of alternating ON and OFF pulses of the synchronization signal based on the determined first positive integer value and the third positive integer value.

6. The electronic device according to claim 4, wherein the one or more first parameters of the determined set of parameters are different from the one or more second parameters of the determined set of parameters.

7. The electronic device according to claim 1, wherein the circuitry is further configured to:
determine, for each imaging device of the plurality of imaging devices, a first OFF threshold value associated with presence of the OFF pulse pattern of the pattern of alternating light pulses;
determine, for each imaging device of the plurality of imaging devices, an amount of light intensity in the first frame of the plurality of images; and
select, for each imaging device of the plurality of imaging devices, the first frame in the plurality of images, based on a determination that the determined amount of light intensity in the first frame is less than the determined first OFF threshold value.

8. The electronic device according to claim 7, wherein
the circuitry is further configured to determine, for each imaging device of the plurality of imaging devices, a set of incremental counter values included in the counter information,
a number of counter values of the set of incremental counter values is based on a first positive integer value corresponding to each imaging device of the plurality of imaging devices and a third positive integer value, and
each counter value in the set of incremental counter values corresponds to one of the first number of frames or the second number of frames of the plurality of subsequent frames.

9. The electronic device according to claim 8, wherein the circuitry is further configured to determine the first number of frames of the first set of frames based on a determination that the determined amount of light intensity in the first set of frames is less than the determined first OFF threshold value and a determination that a counter index number of a corresponding counter value in the set of incremental counter values is an even number.

10. The electronic device according to claim 8, wherein the circuitry is further configured to:
determine, for each imaging device of the plurality of imaging devices, a first ON threshold value associated with presence of the ON pulse pattern of the pattern of alternating light pulses; and
determine the second number of frames of the second set of frames based on a determination that the determined amount of light intensity in the second set of frames is less than the determined first ON threshold value and a determination that a counter index number of a corresponding counter value in the set of incremental counter values is an odd number.

11. The electronic device according to claim 8, wherein the circuitry is further configured to:
determine a base index value of the set of incremental counter values, based on each counter value in the set of incremental counter values, the first positive integer value and the third positive integer value;
determine a resultant index value of the set of incremental counter values, based on the determined base index value of the set of incremental counter values and the determined amount of light intensity in each frame of the plurality of subsequent frames; and
determine the framing offset for each imaging device of the plurality of imaging devices, based on the resultant index value of the set of incremental counter values included in the generated counter information, the frame rate of each imaging device of the plurality of imaging devices, and the first positive integer value included in the set of parameters associated with each imaging device of the plurality of imaging devices.

12. The electronic device according to claim 1, wherein the circuitry is further configured to temporally synchronize the plurality of images captured by the plurality of imaging devices, based on an alignment of the plurality of images corresponding to the framing offset determined for each imaging device of the plurality of imaging devices.

13. A method, comprising:
in an electronic device communicatively coupled to a plurality of imaging devices and one or more first lighting devices:
determining a set of parameters associated with each imaging device of the plurality of imaging devices, wherein the set of parameters includes a frame rate of each imaging device of the plurality of imaging devices;
generating a synchronization signal that includes a preamble pulse of a first time duration and a sequence of alternating ON and OFF pulses, wherein
each pulse of the sequence of alternating ON and OFF pulses is of a second time duration,
the first time duration of the preamble pulse is based on the frame rate of a first imaging device of the plurality of imaging devices and the frame rate of a second imaging device of the plurality of imaging devices, and
the second time duration is based on one or more first parameters of the determined set of parameters associated with each imaging device of the plurality of imaging devices;
controlling the one or more first lighting devices based on the generated synchronization signal to generate a pattern of alternating light pulses, wherein the generated pattern of alternating light pulses is captured by the plurality of imaging devices;
acquiring a plurality of images captured by the plurality of imaging devices, wherein the acquired plurality of images includes information about the captured pattern of alternating light pulses;
determining, for each imaging device of the plurality of imaging devices, a first frame in the acquired plurality of images, wherein the first frame corresponds to an end of a preamble pulse of the captured pattern of alternating light pulses;

determining, for each imaging device of the plurality of imaging devices, an amount of light intensity in each frame of a plurality of subsequent frames of the determined first frame;

generating, for each imaging device of the plurality of imaging devices, counter information based on the determined amount of light intensity in each frame of the plurality of subsequent frames, wherein the generated counter information for each imaging device of the plurality of imaging devices includes:

a first number of frames of a first set of frames corresponding to an OFF pulse pattern of the captured pattern of alternating light pulses, and a second number of frames of a second set of frames corresponding to an ON pulse pattern of the captured pattern of alternating light pulses, and the plurality of subsequent frames includes the first set of frames and the second set of frames;

determining a framing offset for each imaging device of the plurality of imaging devices, based on the generated counter information and the determined set of parameters associated with each imaging device of the plurality of imaging devices; and synchronizing the acquired plurality of images, based on the determined framing offset of each imaging device of the plurality of imaging devices.

14. The method according to claim 13, wherein the determined set of parameters further includes a first positive integer value and a second positive integer value corresponding to each imaging device of the plurality of imaging devices, and the first positive integer value and the second positive integer value are determined based on the frame rate of each imaging device of the plurality of imaging devices.

15. The method according to claim 13, wherein a total duration of the sequence of alternating ON and OFF pulses of the synchronization signal is based on one or more second parameters of the determined set of parameters.

16. The method according to claim 15, wherein the one or more first parameters of the determined set of parameters are different from the one or more second parameters of the determined set of parameters.

17. The method according to claim 13, wherein the plurality of images captured by the plurality of imaging devices is temporally synchronized, based on an alignment of the plurality of images corresponding to the framing offset determined for each imaging device of the plurality of imaging devices.

18. A non-transitory computer-readable medium having stored thereon, computer-executable instructions that when executed by an electronic device, causes the electronic device to execute operations, the operations comprising:

determining a set of parameters associated with each imaging device of a plurality of imaging devices, wherein the set of parameters includes a frame rate of each imaging device of the plurality of imaging devices;

generating a synchronization signal that includes a preamble pulse of a first time duration and a sequence of alternating ON and OFF pulses, wherein each pulse of the sequence of alternating ON and OFF pulses is of a second time duration, the first time duration of the preamble pulse is based on the frame rate of a first imaging device of the plurality of imaging devices and the frame rate of a second imaging device of the plurality of imaging devices, and the second time duration is based on one or more first parameters of the determined set of parameters associated with each imaging device of the plurality of imaging devices;

controlling one or more first lighting devices based on the generated synchronization signal to generate a pattern of alternating light pulses, wherein the generated pattern of alternating light pulses is captured by the plurality of imaging devices;

acquiring a plurality of images captured by the plurality of imaging devices, wherein the acquired plurality of images includes information about the captured pattern of alternating light pulses;

determining, for each imaging device of the plurality of imaging devices, a first frame in the acquired plurality of images, wherein the first frame corresponds to an end of a preamble pulse of the captured pattern of alternating light pulses;

determining, for each imaging device of the plurality of imaging devices, an amount of light intensity in each frame of a plurality of subsequent frames of the determined first frame;

generating, for each imaging device of the plurality of imaging devices, counter information based on the determined amount of light intensity in each frame of the plurality of subsequent frames, wherein the generated counter information for each imaging device of the plurality of imaging devices includes:

a first number of frames of a first set of frames corresponding to an OFF pulse pattern of the captured pattern of alternating light pulses, and a second number of frames of a second set of frames corresponding to an ON pulse pattern of the captured pattern of alternating light pulses, and the plurality of subsequent frames includes the first set of frames and the second set of frames;

determining a framing offset for each imaging device of the plurality of imaging devices, based on the generated counter information and the determined set of parameters associated with each imaging device of the plurality of imaging devices; and synchronizing the acquired plurality of images, based on the determined framing offset of each imaging device of the plurality of imaging devices.

* * * * *